(12) United States Patent
Rakich et al.

(10) Patent No.: US 7,583,874 B2
(45) Date of Patent: Sep. 1, 2009

(54) CONTROLLING OPTICAL RESONANCES VIA OPTICALLY INDUCED POTENTIALS

(75) Inventors: Peter Rakich, Albuquerque, NM (US); Milos Popovic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/262,999

(22) Filed: Oct. 31, 2008

(65) Prior Publication Data

US 2009/0116788 A1      May 7, 2009

Related U.S. Application Data

(60) Provisional application No. 60/984,253, filed on Oct. 31, 2007.

(51) Int. Cl.
*G02B 6/42* (2006.01)
*H01S 3/00* (2006.01)

(52) U.S. Cl. .............................. 385/32; 385/1; 385/31; 385/25; 385/147; 359/346

(58) Field of Classification Search ................ 385/32, 385/1, 2, 3, 15, 14, 31, 147, 122, 25, 27, 385/28, 29; 359/333, 341.1, 346
See application file for complete search history.

(56) References Cited

U.S. PATENT DOCUMENTS

| | | | |
|---|---|---|---|
| 4,142,775 A | | 3/1979 | Ramaswamy et al. |
| 5,625,403 A | | 4/1997 | Hazman et al. |
| 5,900,637 A | | 5/1999 | Smith |
| 6,025,943 A | | 2/2000 | Meekers et al. |
| 6,529,277 B1 | * | 3/2003 | Weitekamp ................ 356/445 |
| 6,636,669 B1 | * | 10/2003 | Chin et al. .................. 385/42 |
| 6,668,111 B2 | * | 12/2003 | Tapalian et al. ............. 385/28 |
| 6,839,482 B2 | | 1/2005 | Margalit et al. |
| 6,947,632 B2 | * | 9/2005 | Fischer ........................ 385/27 |
| 7,123,800 B2 | * | 10/2006 | Kaplan ........................ 385/50 |
| 2003/0156780 A1 | | 8/2003 | Margalit et al. |
| 2003/0210860 A1 | | 11/2003 | Margalit |
| 2004/0013355 A1 | | 1/2004 | Margalit |
| 2004/0056243 A1 | | 3/2004 | Atanackovic et al. |
| 2005/0036737 A1 | | 2/2005 | Stuart |
| 2005/0077526 A1 | | 4/2005 | Shin et al. |
| 2005/0163418 A1 | | 7/2005 | Wong et al. |
| 2005/0196103 A1 | * | 9/2005 | Kaplan ........................ 385/50 |
| 2005/0275921 A1 | | 12/2005 | Haus et al. |
| 2006/0134535 A1 | | 6/2006 | Porque |

FOREIGN PATENT DOCUMENTS

| EP | 0646832 | 4/1995 |
|---|---|---|
| EP | 0909963 | 4/1999 |

(Continued)

OTHER PUBLICATIONS

Altug et al., "Ultrafast Photonic Crystal Nanocavity Laser," Nature Physics 2 (2006) pp. 484-488.

(Continued)

*Primary Examiner*—Brian M Healy
(74) *Attorney, Agent, or Firm*—Goodwin Procter LLP

(57) ABSTRACT

Influence of distance between two coupled strong-confinement photonic devices on optically resonant condition thereof and/or on optical forces.

21 Claims, 20 Drawing Sheets

FOREIGN PATENT DOCUMENTS

| | | |
|---|---|---|
| EP | 1241497 | 9/2002 |
| EP | 1785771 | 5/2007 |
| WO | WO-8501123 | 3/1985 |
| WO | WO-0188580 | 11/2001 |
| WO | WO-0217004 | 2/2002 |
| WO | WO-02063389 | 8/2002 |
| WO | WO-03036841 | 5/2003 |
| WO | WO-2005010618 | 2/2005 |
| WO | WO-2005104147 | 11/2005 |
| WO | WO-2006025760 | 3/2006 |

OTHER PUBLICATIONS

Badolato et al., "Deterministic Coupling of Single Quantum Dots to Single Nanocavity Modes," Science 308 (2005) pp. 1158-1161.
Baehr-Jones et al., "High-Q Ring Resonators in Thin Silicon-on-Insulator," 85 Appl. Phys. Lett. 16 (Oct. 2004) pp. 3346-3347.
Barwicz, "3D analysis of scattering losses due to sidewall roughness in microphotonic waveguides: high index-contrast," 2005 Conf. on Lasers and Electro-Optics (CLEO), vol. 2, pp. 1333-1335.
Becker et al., "Optical Properties of Semiconductors. III. Infra-red Transmission of Silicon," 76 Physical Rev. A, pp. 1531-1532 (1949).
Bozhevolnyi et al., "Channel Plasmon Subwavelength Waveguide Components Including Interferometers and Ring Resonators," Nature 440 (2006) pp. 508-511.
Bustillo et al., "Surface Micromachining for Microelectromechanical Systems," Proc. of the IEEE 86 (1998) pp. 1552-1574.
Chan et al., "Single-mode and Polarization-independent Silicon-on-insulator waveguides with Small Cross Section," 23 J. Lightwave Tech. 6 (Jun. 2005) pp. 2103-2111.
Chuang, S.L., *Physics of Optoelectronic Devices*, (Wiley, NY, 1995).
Daldosso et al., "Fabrication and Optical Characterization of thin two-dimensional Si3N4 Waveguides," Mat. Sci. In Semicond. Proc. 7, (2004) pp. 453-458.
Daldosso et al., "Comparison Among Various $Si_3N_4$ Waveguide Geometries Grown within a CMOS Fabrication Pilot Line," 22 J. Lightwave Tech. 7 (Jul. 2004) pp. 1734-1740.
Dumon et al., "Low-loss photonic wires and compact ring resonators in silicon-on-insulator," 5450 Proc. SPIE 1, pp. 360-368 (2004).
Eichenfield et al., "Actuation of Micro-optomechanical Systems via Cavity-enhanced Optical Dipole Forces," http://arXiv:physics/0702231.
Examination Report in European Patent Application No. 04786154.7, mailed Jul. 16, 2008.
Guo et al., "Characterization of $Si_3N_4/SiO_2$ Planar Lightwave Circuits and Ring Resonators," Proc. Of SPIE, vol. 5350 (2004) pp. 13-22.
Guo et al., "High-Q Microring Resonator for Biochemical Sensors," 5728 Proc. SPIE, pp. 83-92 (2005).
Gritsenko et al., "Short-range order in non-stoichiometric amorphous silicon oxynitride and silicon-rich nitride," 297 J. Non-Crystalline Solids 1, pp. 96-101 (Jan. 2002).
Haus, H.A. *Waves and Fields in Optoelectronics*, (Prentice-Hall, Englewood Cliffs, NJ, 1984).
In et al., "Origami Fabrication of Nanostructured, Three-dimensional Devices: Electrochemical Capacitors with Carbon Electrodes," Appl. Phys. Lett. 88 (2006) 83104.
International Preliminary Report on Patentability and Written Opinion for PCT/US06/028848, mailed Feb. 7, 2008.
International Search Report & Written Opinion for PCT/US2007/026513, mailed Jun. 29, 2008.
International Search Report & Written Opinion for PCT/US2005/043762, mailed Jun. 19, 2008, 8 pages.
International Search Report & Written Opinion for PCT/US2007/015740, dated Feb. 18, 2006 (10 pages).
International Search Report for PCT/US06/28848, mailed Feb. 16, 2007.
Jackson, J.D., *Classical Electrodynamics* (Wiley, NY, 1999).
Johnson et al., "Perturbation Theory for Maxwell's Equations with Shifting Boundaries," Phys. Rev. E, 65, 066611 (2002).
Kippenberg et al., "Analysis of Radiation-pressure Induced Mechanical Oscillation of an Optical Microcavity," Phys. Rev. Lett. 95 (2005) 033901.
Kogelnik et al., "Switched Directional Couplers with Alternating Δβ," 12 IEEE J. Quantum Elec. 7, pp. 396-401 (1976).
Korotky, "Three-Space Representation of Phase-Mismatch Switching in Coupled Two-State Optical System," 22 IEEE J. Quantum Elec. 6, pp. 952-958 (1986).
Little et al., "Very High-order Microring Resonator Filters for WDM Applications," 16 IEEE Photonics Tech. Lett. 10 (Oct. 2004) pp. 2263-2265.
Maboudian et al., "Critical Review: Adhesion in Surface Micromechanical Structures," J. Vac. Sci. Tech. B, 15 (1997).
Madsen et al., *Optical Filter Design and Analysis: A Signal Processing Approach*, (Wiley, NY, 1999).
Madsen et al., "A Multi-Port Add/Drop Router using UV-induced Gratings in Planar Waveguides," Lucent Technologies, pp. 104-106.
Melchiorri et al., "Propogation Losses of Silicon Nitride Waveguides in the Near Infrared Range," Appl. Phys. Lett. 86, 121111 (2005).
Mizrahi et al., "Two Slab Optical Spring," Optics Lett. 32 (2007) pp. 692-694.
Mizrahi et al., "Mirror Manipulation by Attractive and Repulsive Forces of Guided Waves," Opt. Express 13 (2005) pp. 9804-9811.
Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.
Nichols et al., "A Preliminary Communication on the Pressure of Heat and Light Radiation," Phys. Rev. 13 (1901) pp. 307-320.
Nielson et al., "Integrated Wavelength-selective Optical MEMS Switching using Ring Resonator Filters," IEEE Photonics Tech. Lett. 17 (2005) pp. 1190-1192.
Nielson, G.N., "Micro-opto-mechanical Switching and Tuning for Integrated Optical Systems," Ph.D. Thesis, Massachusetts Institute of Technology (2004).
Notomi et al., "Optomechanical Wavelength and Energy Conversion in High-Q Double-layer Cavities of Photonic Crystal Slabs," Phys. Rev. Lett. 97 (2006) 023903.
Oda et al., "A Wide-FSR Waveguide Double-Ring Resonator for Optical FDM Transmission Systems," 9 J. Lightwave Tech. 6, pp. 728-736 (1991).
Okamoto, K., *Fundamentals of Optical Waveguides*, (Elsevier Academic Press, MA, 2006).
Philipp et al., "Amorphous Silicon Rich Silicon Nitride Optical Waveguides for High Density Integrated Optics," 40 IEEE Electronics Letters 7, pp. 419-420. (Apr. 2004).
Popovic et al., "Multistage High-Order Microring-Resonator add-drop Filters," 31 Optics Lett. 17 (Sep. 2006) pp. 2571-7253.
Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.
Popovic, M., "Complex-frequency Leaky Mode Computations using PML Boundary Layers for Dielectric Resonant Structures," Proc. of Integ. Photonics Res. (Jun. 2003).
Popovic et al., "General Approach to Hitless Switching and FSR Extension Resonators in Integrated Photonic Circuits," (2006) Paper OW166.
Popovic, "Air Trenches for Dense Silica Integrated Optics," MS Thesis, Massachusetts Institute of Technology, Dept. of Electrical Engineering & Computer Science, Feb. 2002, p. 53.
Povinelli et al., "Evanescent-wave Bonding Between Optical Waveguides," Optical Lett. 30 (2005) pp. 3042-3044.
Povinelli et al., "High-Q Enhancement of Attractive and Repulsive Optical Forces between Coupled Whispering-gallery-mode Resonators," Opt. Express 13 (2005) pp. 8286-8295.
Qi et al., "A Three-dimensional Optical Photonic Crystal with Designed Point Defects," Nature 429 (2004) pp. 538-542.

Rakich et al., "Ultrawide Tuning of Photonic Microcavities via Evanescent Field Perturbation," Optics Lett. 31 (2006) pp. 1241-1243.

Rakich et al., "Cavity-Trapping via Optical-forces in Integrated Photonics," Massachusetts Institute of Technology.

Rakich et al., "Achieving Centimeter-scale supercollimation in a Large-area Two-dimensional Photonic Crystal," Nature Materials 5 (2006) pp. 93-96.

Sarid, D., Scanning Force Microscopy with Applications to Electric, Magnetic, and Atomi Forces, (Oxford University Press, NY, 1994).

Saynatjoki et al., "High-index-contrast Optical Waveguides on Silicon," 2 pages.

Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (1998).

Song et al., "Ultra-high-Q Photonic Double-heterostructure Nanocavity," Nature Materials 4 (2005) pp. 207-210.

Spector et al., "Hybrid multi-mode/single-mode Waveguides for Low Loss," Massachusetts Institute of Technology, 3 pages.

Srinivasan et al., "Alkyltrichlorosilane-based Self-assembled Monolayer Films for Stiction Reduction in Silicon Micromachines," J. of Microelectromechanical Sys. 7 (1998) pp. 252-260.

Tormen, "Passive Optical Integrated Components for Telecommunication," Universite De Nice-Sophia Antipolis (2003) 196 pages.

Van Spengen et al., "A Physical Model to Predict Stiction in Mems," J. of Micromechanics & Microengineering 12 (2002) pp. 702-713.

Yanagase et al., "Box-Like Filter Response and Expansion of FSR by a Vertically Triple Coupled Microring Resonator Filter," 20 J. Lightwave Tech. 8, pp. 1525-1529 (2002).

Partial International Search Report for International Application No. PCT/US2008/080749, mailed Mar. 24, 2009.

Chen et al., "Low-loss multimode-interference-based crossings for Silicon Wire Waveguides," 18 IEEE Photonics Letters 21, pp. 2260-2262 (2006).

Liu et al., "Low-loss waveguide crossing using a multimode interference structure," 241 Optics Communications 1-3, pp. 99-104 (2004).

Bogaerts et al., "Low-loss, low-cross-talk crossings for silicon-on-insulator nanophotonic waveguides," 32 Optics Letters 19, pp. 2801-2803 (1995).

Tang et al., Highly efficient optical phase modulator in SOI waveguides, 31 Electronics Letters 6, pp. 451-452 (1995).

Xu et al., "Micrometre-scale silicon electro-optic modulator," Nature, vol. 435, pp. 325-327 (2005).

International Search Report & Written Opinion for PCT/US2008/082054, mailed Mar. 18, 2009.

Povinelli et al., "Enhancement mechanisms for optical forces in integrated optics," 6326 Proc. of SPIE Optical Trapping & Optical Manip. III 15, (2006).

Rakich et al., "Trapping, corraling and spectral bonding of optical resonances through optically induced potentials," 1 Nature Photonics 11, pp. 658-665 (2007).

* cited by examiner

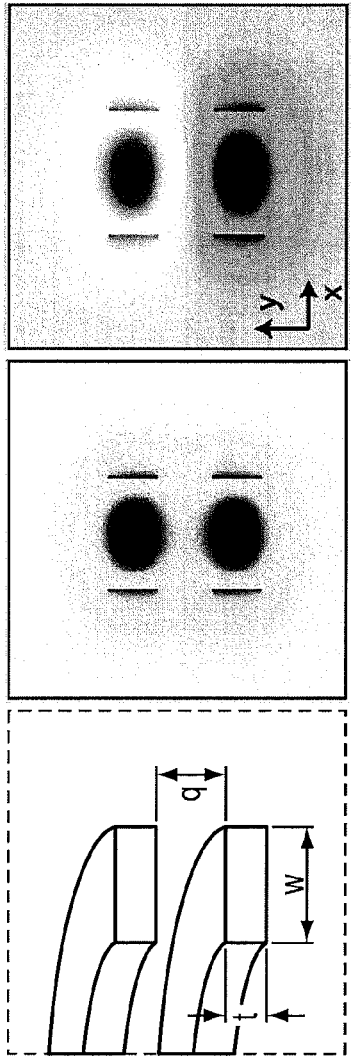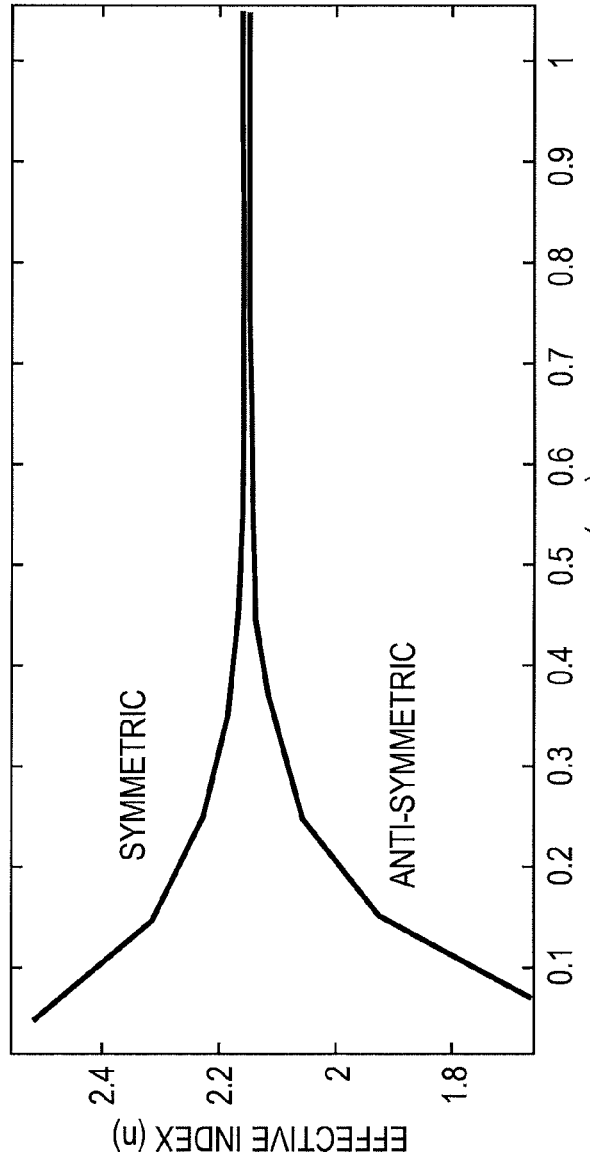
FIG. 5A FIG. 5B FIG. 5C FIG. 5D

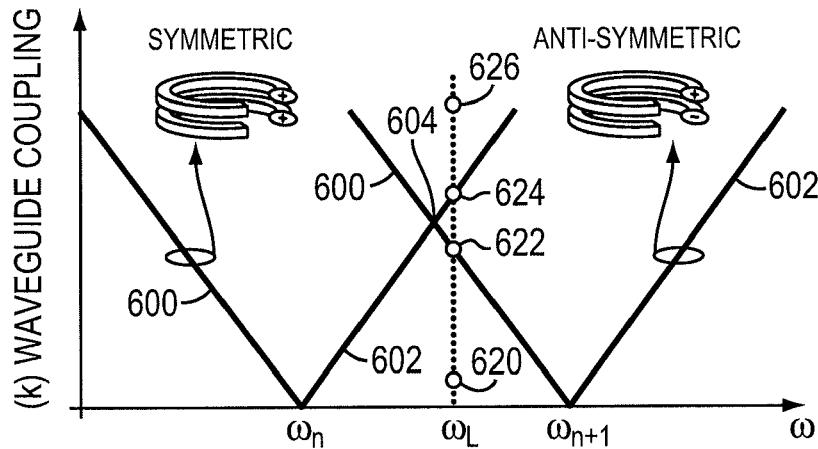
FIG. 6A
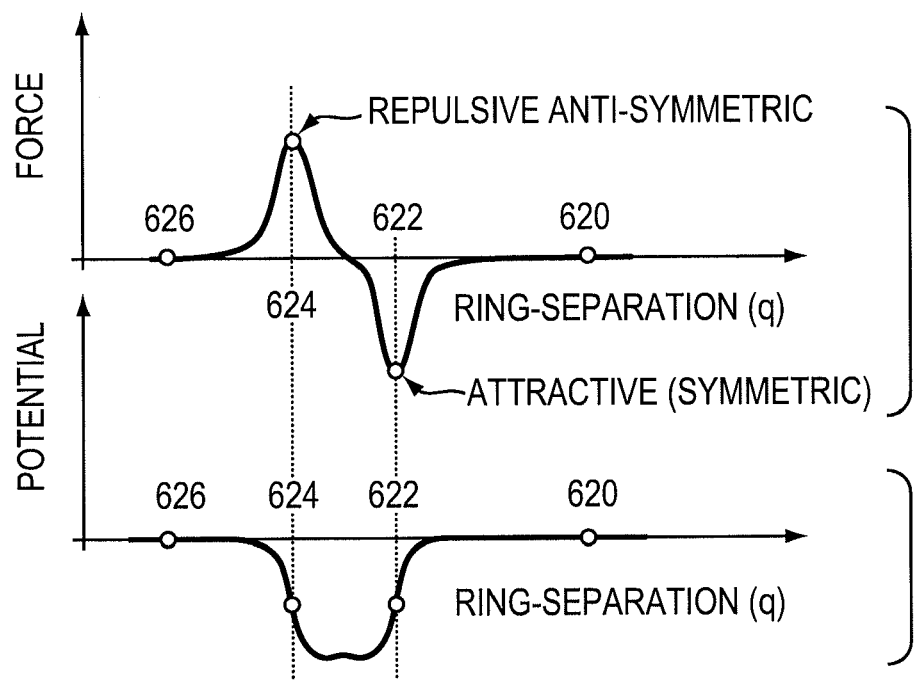
FIG. 6B
FIG. 6C

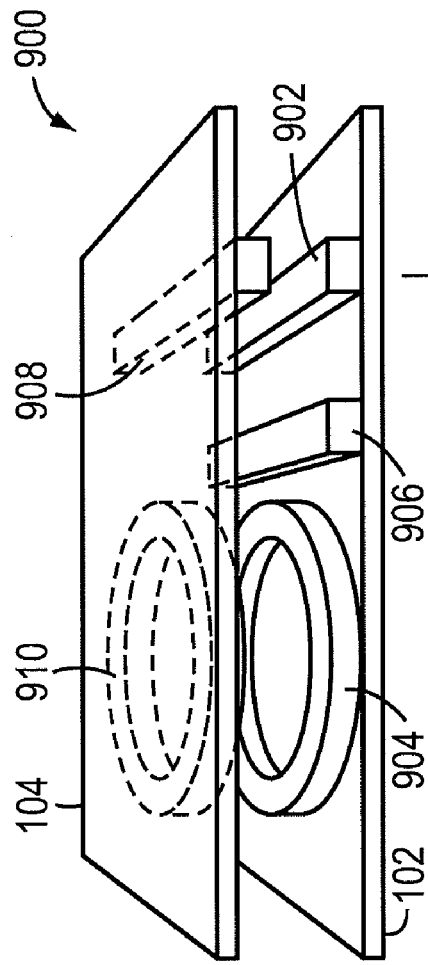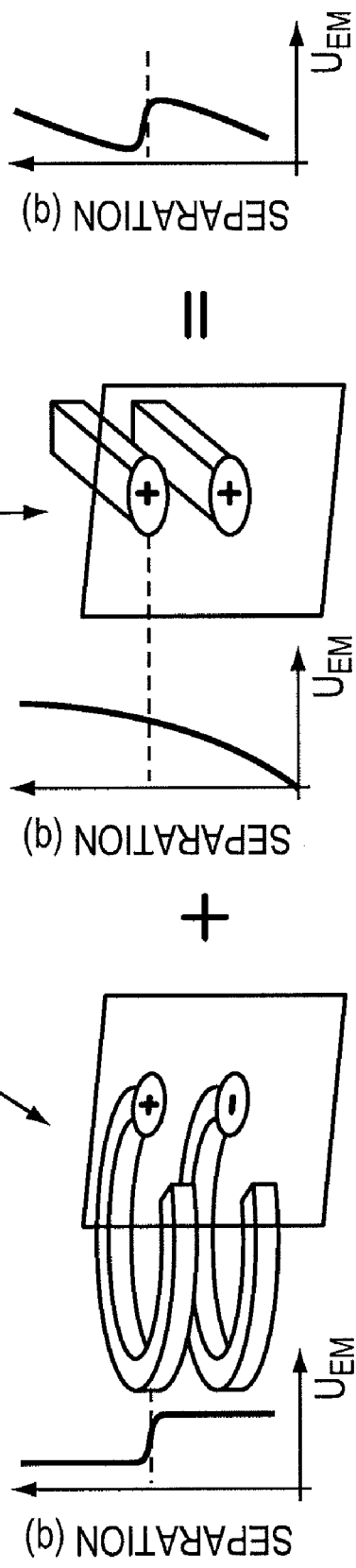
FIG. 9A
FIG. 9B
FIG. 9C
FIG. 9D

CONTROLLING OPTICAL RESONANCES VIA OPTICALLY INDUCED POTENTIALS

RELATED APPLICATIONS

This invention claims priority to and the benefit of U.S. Provisional Application Ser. No. 60/984,253, filed Oct. 31, 2007, the entire contents of which are hereby incorporated by reference.

GOVERNMENT LICENSE RIGHTS

This invention was made with government support under Contract Number DAAD-19-02-D0002 awarded by Army Research Office through the Institute for Soldier Nanotechnologies. The government has certain rights in the invention.

FIELD OF THE INVENTION

The present invention generally relates to optomechanical devices for integrated optics, and, more particularly, to self-adaptive, coupled strong-confinement photonic devices.

BACKGROUND

The field of integrated photonics seeks to miniaturize optical components such as modulators, resonators, filters and waveguides, integrating them on a chip in the form of optical circuits. The fabrication of integrated photonic circuits through lithographic and other manufacturing methods promises to: (1) reduce cost and size, (2) increase complexity, and (3) improve overall performance of optical systems. Furthermore, high refractive index contrast (HIC) photonic circuits have the potential to further reduce component sizes and improve performance. Over the past decade, progress has been made in the field of HIC integrated photonics toward the development of practical and low-loss waveguides, high performance filters, resonators and modulators. However, numerous challenges need to be addressed to facilitate wide implementation of such integrated circuits. Among these challenges are the extreme sensitivity of HIC photonic circuits to fabrication uncertainties, and the sensitivities of HIC circuits to the environment.

Optical cavities are important in the field of integrated photonics because they form the building block for optical filters necessary to process and route data. However, as optical cavities shrink to smaller and smaller dimensions, in the context of HIC integrated photonics, dimensional sensitivities of the cavity's resonance frequency make it difficult to directly fabricate a HIC cavity to the designed optical frequency. For instance, the lithographic fabrication of identically patterned ring resonators generally results in a large range of resonance frequencies across the patterned wafer. However, dimensional variations, for instance, resulting from a slow variation in deposited layer thickness often result in a gradual drift of the cavity resonance frequency globally, while locally, the cavity frequencies are quite well matched (provided that the lithography is of high fidelity).

In addition to their extreme sensitivities to dimensional variations, HIC photonic circuits, such as those made from silicon, tend to be sensitive to their environment. For instance, since the refractive index of silicon changes rapidly with temperature, it may become challenging to stabilize the frequency of a cavity against thermal environmental variations.

Since a photonic microcavity, such as a microring, is generally of fixed dimensions, e.g., as a consequence of being "frozen" into a material on the surface of a lithographically patterned chip, tuning an integrated microcavity over a large wavelength range may be challenging. For example, the device path-length typically may not be changed sufficiently to appreciably tune the resonant wavelength. A more feasible approach to changing the resonance wavelength involves modifying the material that the waveguiding structure is comprised of, e.g., by heating or compressing it. Both types of perturbations generally result in a change of refractive index of the material, and, consequently, in a change of the effective index of the guided mode, which enables wavelength tuning. In this approach, the maximum tuning range is generally limited by the maximum thermal change that a heater can supply, or the maximum force that the material can sustain. In many cases, the maximum relative tuning of the cavity frequency that can be achieved is about 1%, which is far less than what is commonly achieved in bulk-component, free-space tunable fabry-perot filters.

An alternative way to tune microcavities is to change the effective index of the guided mode through optomechanical means rather than by changing material properties. This method enables cavity tunings of about 10%, as a change in waveguide geometry may be designed to result in a much larger change in effective index than material perturbations can generally afford. However, optomechanical cavity tuning generally requires precise control of the relative motion of a perturbing structure and the waveguide, often on a picometer scale, to stabilize the cavity frequency to a useful degree.

Accordingly, there is a need for tunable, stabilized HIC photonic devices with increased tolerance for fabrication errors.

SUMMARY OF THE INVENTION

Embodiments of the present invention include optomechanically variable photonic systems that utilize optical resonances to generate optically induced force and potential profiles. The optomechanical systems may include one or more optical resonators that passively track the frequency of an incident optical driving signal through the action of optical forces produced by the optical driving signal. In some embodiments, precise mechanical actuation of the mechanical state of the optomechanical system may be achieved through a change of the frequency of the optical driving signal. Further, the systems may enable the creation of highly localized and tailorable optically induced potential wells with which the mechanical state of the optomechanical system may be precisely controlled.

In general, in a first aspect, embodiments of the invention include an optomechanical system including a first strong-confinement photonic device (SCPD) with an optically coupled optical input port. A second SCPD is optically coupled to, and movably positioned with respect to, the first SCPD. The first and/or second SCPD includes an optical resonator. An optical mode, excited in the input port, induces an optical force acting on the second SCPD. At a first distance between a location in the first SCPD and a location in the second SCPD, the optical force points towards the location in the first SCPD. At a second distance between the location in the first SCPD and the location in the first SCPD, the optical force points away from the location in the first SCPD. The first distance is greater than the second distance.

One or more of the following features may be included. The optical force may result from a coupling of an optical field in a first region including the location in the first SCPD with an optical field in a second region including the location in the second SCPD, and the optical force may be attractive at the first distance and repulsive at the second distance.

The optical force may include a first force component resulting from a coupling of an optical field in a first region of the first SCPD, which includes the location in the first SCPD, with an optical field in a first region of the second SCPD, which includes the location in the second SCPD. The optical force may further include a second force component resulting from a coupling of an optical field in a second region of the first SCPD and an optical field in a second region of the second SCPD, the first component being attractive at the first distance, and the second component being repulsive at the second distance. A relative motion between the first region of the first SCPD and the first region of the second SCPD may be parallel to a relative motion between the second region of the first SCPD and the second region of the second SCPD. The first and second components may be attractive or repulsive, and the relative motion between the first region of the first SCPD and the first region of the second SCPD may be anti-parallel to a relative motion between the second region of the first SCPD and the second region of the second SCPD.

The first and/or second SCPD may include a waveguide, an optical resonator, a plasmonic structure, a dielectric structure, and/or a semiconductor structure. A magnitude of the optical force may be locally maximal at the first and the second distances, and a mechanical coupling between the first and second SCPDs may induce a mechanical force, smaller than the optical force at the first and second distances, acting on the second SCPD. In addition, a difference between and/or an average of the first and second distances may depend on a wavelength associated with the optical mode.

In general, in another aspect, embodiments of the invention include an optomechanical system including a first photonic device, which includes a first strong-confinement photonic device (SCPS), a second SCPS disposed at a fixed position with respect to the first SCPS, and an optical input port optically coupled to the first and second SCPSs. The second photonic device includes a third SCPS optically coupled to the first SCPS, and a fourth SCPS disposed at a fixed position with respect to the third SCPS and optically coupled to the second SCPS. The second photonic device is movably positioned with respect to the first photonic device. An optical mode excited in the optical input port induces a first optical force between the first and third SCPSs, and a second optical force between the second and fourth SCPSs. The first optical force is attractive and greater in magnitude than the second optical force at a first distance between the first and second photonic devices. The second optical force is repulsive and greater in magnitude than the first optical force at a second distance between the first and second photonic devices, and the first distance is greater than the second distance.

One or more of the following features may be included. The first and third SCPSs may each include a waveguide, and the second SCPS may include an optical resonator, which may include a microring resonator. The fourth SCPS may include an optical resonator, a dielectric structure, a semiconductor structure, a plasmonic structure, and/or a metal structure. A sum of the first optical force and the second optical force may have locally maximal magnitudes at the first and second distances. An average of the first and second distances may depend monotonically on a wavelength associated with the optical mode.

The system may further include an optical filter, which, in turn, includes an optical resonator disposed at a fixed position with respect to the second SCPS of the first photonic device, an SCPD optically coupled to the optical resonator and disposed at a fixed position with respect to the fourth SCPS of the first photonic device, an optical filter input port optically coupled to the optical resonator, and an optical filter output port optically coupled to the optical resonator. The optical coupling between the first SCPD and the input port of the first photonic device may be weaker than the optical coupling between the optical resonator and the optical filter input port of the optical filter. A resonance of the optical filter may depend on a resonance of the first photonic device. A difference between a resonance frequency of the optical filter and a resonance frequency of the first photonic device may be fixed.

In general, in another aspect, embodiments of the invention include an optomechanical system including a first SCPD and a second SCPD optically coupled to, and movably positioned with respect to, the first SCPD. Light coupled into at least the first SCPD adjusts a relative position between the first SCPD and the second SCPD to an optically resonant condition.

BRIEF DESCRIPTION OF THE DRAWINGS

The foregoing discussion will be understood more readily from the following detailed description of the invention when taken in conjunction with the accompanying drawings, in which:

FIG. 5A is a schematic diagram depicting a cross section of the dual-microring resonator system of FIGS. 4A-4D;

FIGS. 5B-5C are computed images showing electrical field distributions in the cross section of FIG. 5A;

FIG. 5D is a graph illustrating resonance splitting of coupled modes according to an embodiment of the invention;

FIGS. 6A-6C are schematic diagrams illustrating optical forces and potentials generated near resonance crossings in some embodiments of the invention;

FIG. 9A is a schematic diagram depicting a self-aligning resonator system according to an embodiment of the invention;

FIGS. 9B-9D are schematic diagrams illustrating the generation of an optical potential in the self-aligning resonator system of FIG. 9A;

DETAILED DESCRIPTION OF THE INVENTION

In general, embodiments of the invention use optical forces between optically coupled strong-confinement photonic devices to adjust a mechanical degree of freedom between the devices, such as a relative position or orientation. The setting of the mechanical degree of freedom, in turn, affects the strength of optical coupling, and, consequently, of the forces between the devices. At optical resonances of the combined system, the coupling is typically particularly strong. Moreover, the resonance frequencies may depend on the coupling. By exploiting this dependence, optomechanical systems that self-adjust to trap optical resonances, and/or spectrally bond the resonances to an input light signal, may be designed.

The devices used in various embodiments of the invention contain strong-confinement photonic structures (SCPS). As used herein, an SCPS is a structure capable of confining, and optionally enhancing, an optical-regime electromagnetic field within a space on the scale of a few wavelengths, preferably less than a wavelength, in at least one dimension, preferably in two or in all three dimensions (in an arbitrary coordinate system of choice). An example of an SCPS with 1D-confinement is a slab waveguide SCPS; an SCPS with 2D-confinement may be a channel waveguide; and an SCPS with 3D-confinement may be a resonator. The optical regime, as used herein, denotes a range of frequencies larger than 1 THz (corresponding to wavelengths shorter than 300 μm in the THz-wave regime) and smaller than 3000 THz (corresponding to wavelengths longer than 100 nm in the UV regime).

Figure 1A:
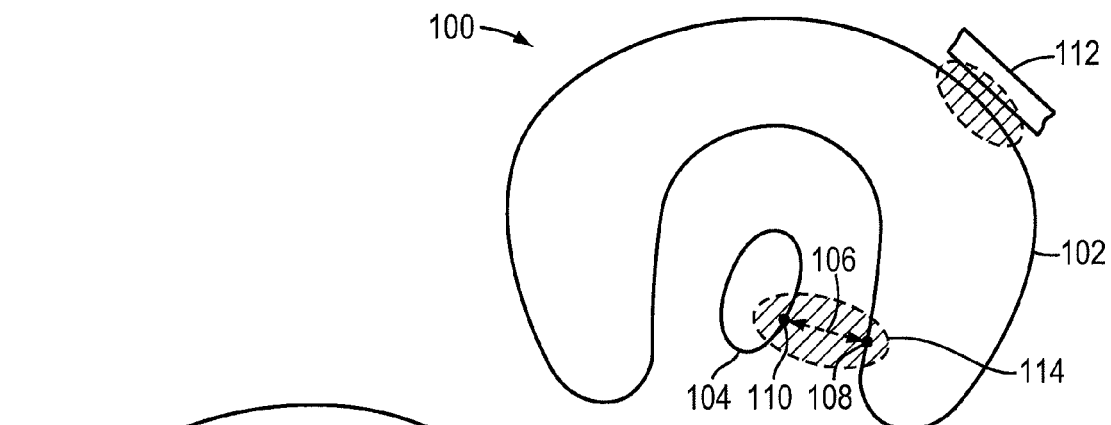
FIGS. 1A-1D are schematic diagrams illustrating an optomechanical system utilizing co-located attractive and repulsive optical forces according to some embodiments of the invention.
Figure 1B:
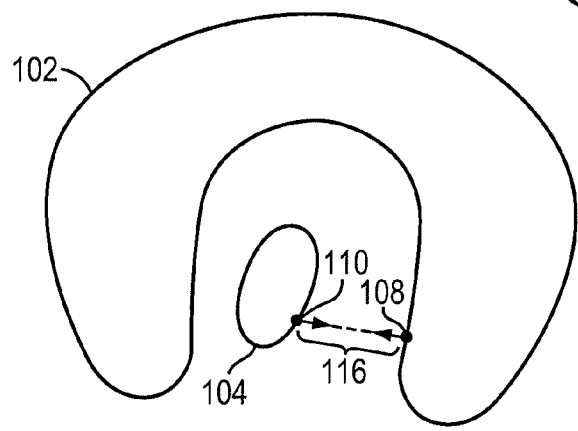
Figure 1C:
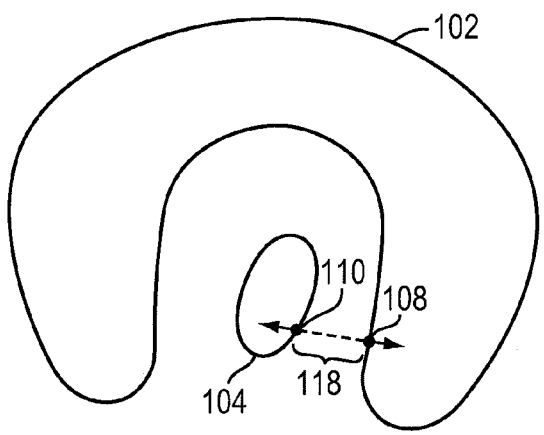
Figure 1D:
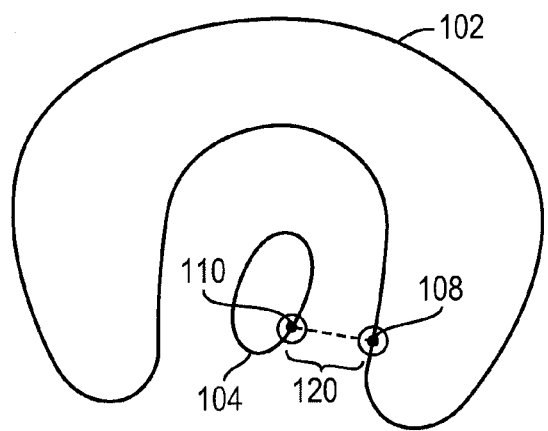
Figure 2A:
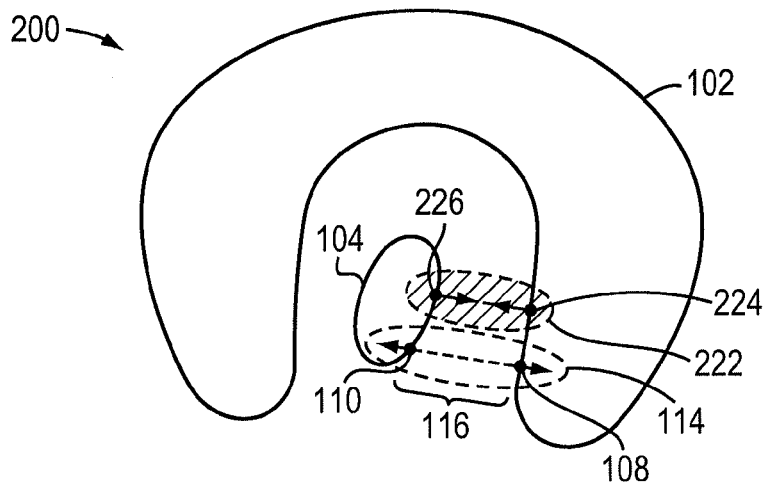
FIGS. 2A-2C are schematic diagrams illustrating an optomechanical system utilizing non-co-located attractive and repulsive optical forces according to some embodiments of the invention.
Figure 2B:
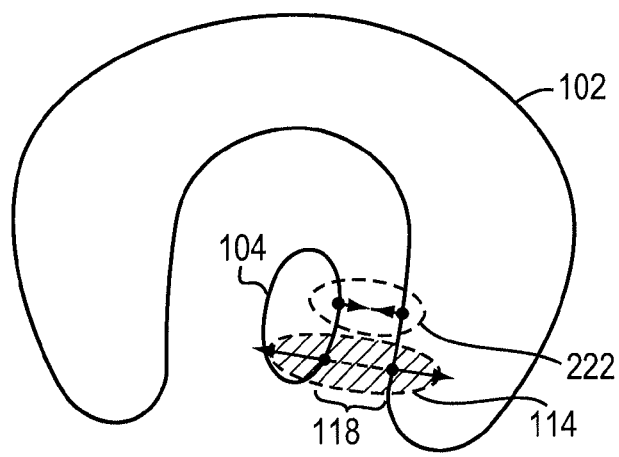
Figure 2C:
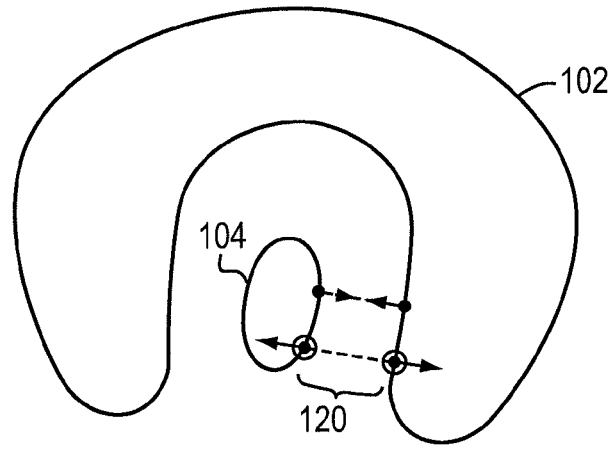
Figure 3A:
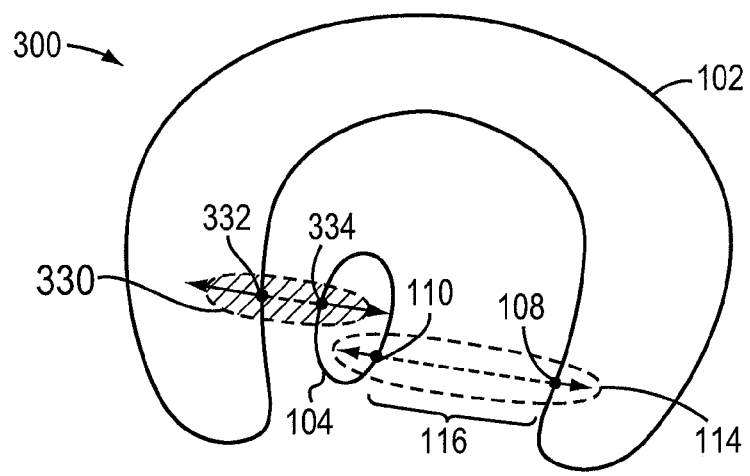
FIGS. 3A-3C are schematic diagrams illustrating an optomechanical system utilizing non-co-located repulsive optical forces according to some embodiments of the invention.
Figure 3B:
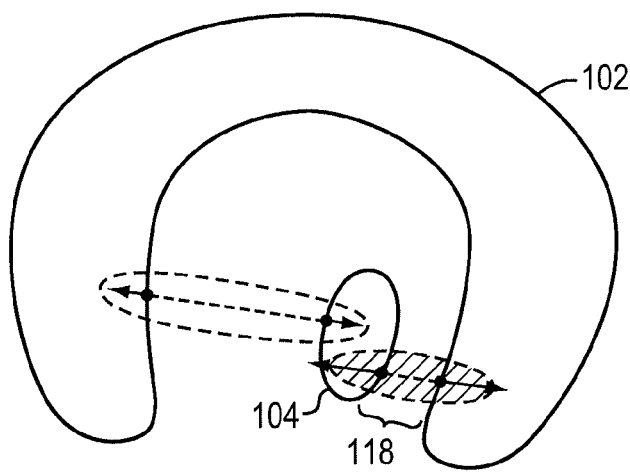
Figure 3C:
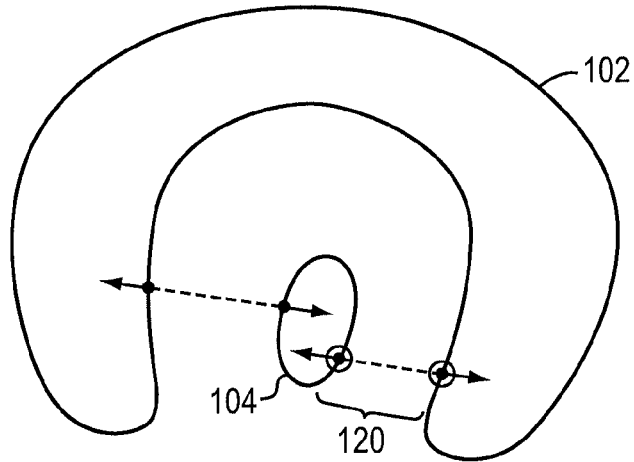

An optomechanical SCPD contains one or more SCPSs. FIGS. 1-3 illustrate, at a conceptual level, various topologies of optomechanical systems in accordance with the invention. Referring to FIG. 1A, a system 100 may include at least two photonic devices, e.g., a first SCPD 102, and a second SCPD 104, at least one of which may include an optical resonator. The SCPDs may further include waveguides, dielectric structures, semiconductor structures, and plasmonic (metallic) structures (e.g., planar metallic structures or, alternatively, patterned metallic structures such as plasmonic waveguides or resonators). The second SCPD 104 is movable with respect to the first SCPD 102. The relative location or, in some embodiments, relative orientation between the two devices 102, 104 may be described in terms of the distance 106 between a location 108 in the first device 102, and a location 110 in the second device 104. (Locations 108, 110 serve as points of reference for the description, but do not have any physical significance in themselves.) The distance 106 changes as the second device 104 moves relative to the first device 102. An input port 112 (illustrated in FIG. 1A only, and omitted in FIGS. 1B-1D, 2A-2C, and 3A-3C for clarity) may be optically coupled to the first device 102. In some embodiments, the input port 112 may also be coupled to the second device 104. When an optical mode is excited in the input port 112, light couples into the first device 102 and, through one or more coupling regions between the first and second devices (e.g., region 114), into the second device 104. This results in an optical force acting on the first device 102, and a corresponding opposite force of equal magnitude acting on the second device 104.

The optical forces acting on the two devices depend on the coupling strength between an optical field in the first device 102 and an optical field in the second device 104. The coupling strength, in turn, is a function of the distance 106 between the devices in the coupling region 114. The coupling region 114 includes a first region of device 102 encompassing location 108, and a first region of device 104 encompassing location 110. The relationship between the distance 106 and the direction and magnitude of the induced optical forces depends on the particular features of the devices. In the embodiments conceptually illustrated in FIGS. 1A-1D, the mutual force between the first and second devices 102, 104 in the coupling region 114 is attractive at a first distance 116, i.e., the force acting on the second device points towards the location 108 in the first device 102 (see FIG. 1B). As the second device 104 is brought closer to the first device 102, the mutual force become repulsive at a second, shorter distance 118, i.e., the force acting on the second device points away from the location 108 in the first device (see FIG. 1C). The forces generate an optical potential, resulting in an equilibrium distance 120 between the first and second distances 116, 118, as shown in FIG. 1D.

FIGS. 2A-2C illustrate embodiments in which an equilibrium distance of a system 200 results from forces between the two devices 102, 104 in two separate coupling regions 114, 222, i.e., from forces that are not co-located. The second coupling region 222 includes a second region in the first device 102 (encompassing a second location or reference point 224 in that device) and a second region in the second device 104 (encompassing a second location 226 in the second device). In some embodiments, the force acting on the second device 104 has two components: a first component between the two locations 108, 110 encompassed in the first coupling region 114, resulting from coupling of optical fields in this region 114, and a second component between the two locations 224, 226 in the second coupling region 222, resulting from coupling of optical fields in that second region. Referring to FIG. 2A, at a first distance 116 between the locations 108,110 in the first coupling region, the optical force in the second coupling region 222 may be attractive, and dominate over a repulsive force in the first coupling region 114, so that the total force acting on the second device 104 is attractive, i.e., acts to decrease the distance between the locations 108, 110 in the first coupling region. At a second, shorter distance 118, illustrated in FIG. 2B, a repulsive force in the first coupling region 114 may exceed an attractive force in the second coupling region 222 in magnitude, resulting in an overall repulsive force. Again, at a distance 120 smaller than the first distance 116 and greater than the second distance 118, the system reaches equilibrium. The forces in the coupling regions 114, 222 may be—but need not be—parallel. If the forces define an angle greater than zero degrees with respect to each other, their respective components in a direction along some distance between the two devices 102, 104, e.g., as defined between the locations 108, 110 in the first coupling region, may be used to determine the direction and magnitude of the total force.

In optomechanical systems 200, the first and second regions in the first device 102 that contribute to optical coupling may lie on substantially the same side of the second device 104. Consequently, if the distance between the locations 108,110 in the first coupling region 114 decreases, the distance between the locations 224, 226 in the second coupling region 224 also decreases. The relative motion between the two devices 102, 104 may be parallel in the two coupling regions 114, 222. However, the locations in the respective devices and coupling regions do not need to be selected such that their connecting lines are parallel. In alternative systems 300, illustrated in FIGS. 3A-3C, first and second coupling regions 114, 330 may be located such that the second device 104 moves away from the first device 102 in the second coupling region 330 when it moves towards the first device 102 in the first coupling region 114. In this case, an optical potential may be achieved by optical forces of the same type in both coupling regions, i.e., two attractive forces or two repulsive forces. In FIG. 3A, at a first distance 116, a mutual optical force due to interacting optical fields in a second coupling region, encompassing a second location 332 in the first device 102 and a second location 334 in the second device 104, may be greater in magnitude than a mutual repulsive force in the first coupling region 114. Consequently, the total force acting on the second device 104 is directed towards the first location 108 in the first device 102. At a second distance 118, the repulsive force in the first coupling region 114 is greater, and the second device 104 moves away from the first location 108 in the first device (see FIG. 3B). The repulsive forces may balance each other at an intermediate distance 120, as shown in FIG. 3C.

With reference to FIGS. 1-3, the first and second distances 116, 118 may be defined as the distances between the locations (or reference points) 108, 110 in the first and second devices at which the attractive and repulsive forces, respectively, reach a local maximum. With this definition, the difference between the first and second distances corresponds to the width of the potential. In some embodiments, the width (corresponding to the difference between the first and second distances) and/or the position (corresponding to the average of the first and second distances) of the potential depend on a wavelength of the optical mode inducing the forces. Further, in some embodiments, a mechanical coupling between the first and second devices 102, 104 is weaker than the optical coupling, meaning that a mechanical force acting on the second device 104, arising from a mechanical coupling between the first and second devices 102, 104, is smaller than the optical force between the first and second devices at the first and second distances. The first and second optical devices may be movable relative to one another over a substantial range, i.e., over at least $1/100^{th}$ of the wavelength used, with relatively small mechanical restoring forces (e.g., with a mechanical restoring force less than one-half, preferably less than one-tenth, more preferably less than one-hundredth of the greatest optical forces achieved in the system).

Embodiments of the invention include systems, and properties and behaviors thereof, not illustrated in FIGS. 1-3. For example, a system may contain more than two components, and coupling between two devices may take place in more than two regions. Furthermore, the optical forces may act to cause a change in orientation of the second device 104 relative to the first device 102, instead of, or in addition to, the above-described change in position.

Figure 4A:
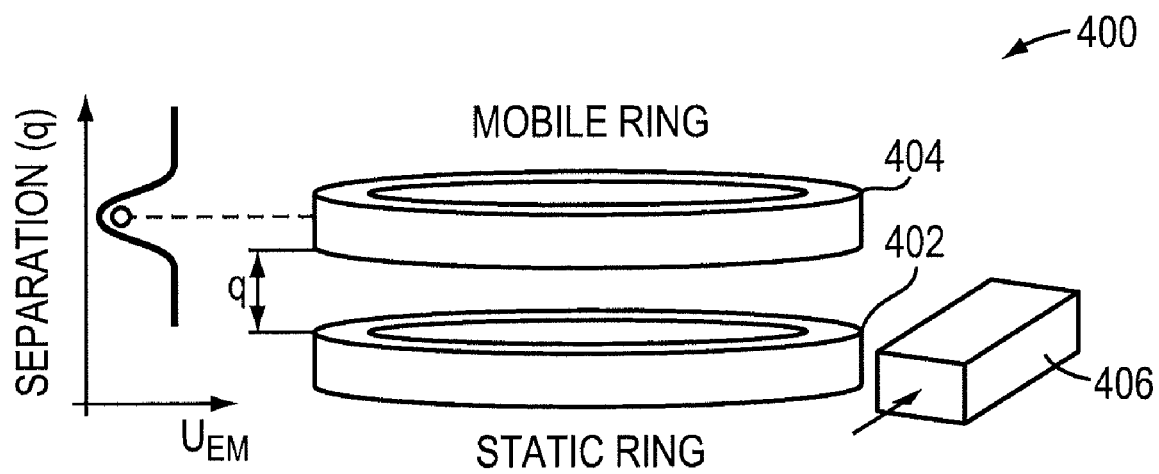
FIGS. 4A-4D are schematic diagrams depicting a dual-microring resonator system according to an embodiment of the invention.

An exemplary optomechanical system 400 having the topology illustrated in FIGS. 1A-1D is depicted in FIGS. 4A-4D. Referring to FIG. 4A, the system may include two microring resonators 402, 404 (in the following also referred to as "microrings") with similar dimensions, corresponding to the first and second strong-confinement photonic devices 102, 104, respectively, and a bus waveguide 406 providing the input port. In the embodiment as shown, the microring resonators are of substantially the same dimensions, and lie in parallel planes, with their respective centers falling on the same axis perpendicular to the parallel planes. This arrangement may be advantageously enable strong optical coupling between the microring resonators 402, 404. In some embodiments, the resonators may be laterally shifted or rotated with respect to each other, or may have different shapes and/or dimensions.

The rings are separated by a distance q between reference points in the two microring resonators 402, 404. This distance q is variable, and constitutes the mechanical degree of freedom that permits relative motion between the microrings 402, 404. The ambient medium (with refractive index $n_{amb}$) in which the microrings 402, 404 are immersed, i.e., over which motion occurs, may include vacuum ($n_{amb}=1.0$), a gas, a liquid, or a gas plasma.

Figure 4B:
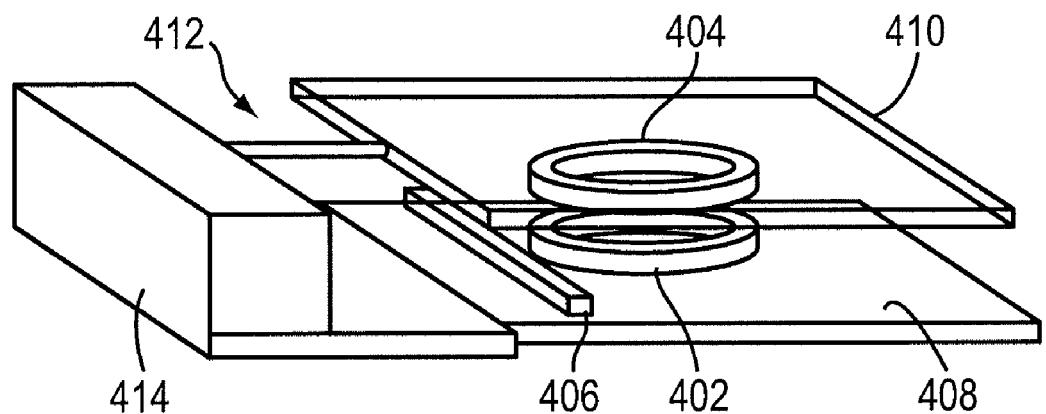

An optomechanical system with movable parts may be realized in various ways. For example, as illustrated in FIG. 4B, the first photonic device, e.g., a microring resonator 402 coupled to an input waveguide 406, may be patterned on a wafer 408, and the second photonic device, here another microring resonator 404, may be patterned on a thin second wafer 410 suspended from a weak spring 412. Alternatively, the structures may be formed in a multilayer fabrication process on a single wafer, using successive lithography and etching steps, and optionally additional material layer deposition steps. The movable structures may be released by etching away a sacrificial material layer, using known methods for microelectromechanical system (MEMS) and nanoelectromechanical system (NEMS) technology. The two devices may be mechanically coupled by a supporting structure 414. In order to provide weak mechanical restoring forces, the supporting structure 414 may include a tethering section 412 with a weak (small) spring constant, such that small displacements of one structure 410 with respect the other structure 408 result in a small restoring force. Alternatively to such a cantilever structure, the microring resonator 404 may, for example, be embedded in a membrane spanned between two support structures. The effective spring constants of these configuration may be engineered such that small displacements of the second ring, closer to or further from the first ring, do not result in substantial mechanical restoring forces. In some embodiments, restoring forces of less than one µN, or even less than 1 nN, may be achieved. In comparison, optical coupling between the resonators may induce forces reaching several µN.

At large distances between the microrings 402, 404, each of them may have a set of resonant modes at evenly spaced frequencies ω. At the resonance frequencies, the round trip phase of an optical wave travelling in the ring is an integer multiple of 2π, or $$\beta_\pm L = (\omega/c) n_\pm L = 2\pi m,$$

where β denotes the propagation constant, c denotes the speed of light in vacuum, L denotes the circumference of the resonator, and m denotes an integer corresponding to the resonance order. If the microring resonators 402, 404 have the same shape and dimensions, their respective resonance frequencies may substantially coincide. As the separation q between the microring resonators 402, 404 is decreased, the optical fields in the two microring resonators 402, 404 may couple, creating symmetric and anti-symmetric supermodes, whose frequencies $\omega_+$ and $\omega_-$, respectively, depend on $\kappa$, the coupling strength normalized by $2\pi/\lambda$ (wherein $\lambda$ is the wavelength of light coupled into the system), and are given by:

$$\omega_\pm^m(\kappa) \cong \omega_m \mp \left(\frac{\omega_m \cdot \kappa(q)}{n_g}\right). \quad (1)$$

Figure 4C:
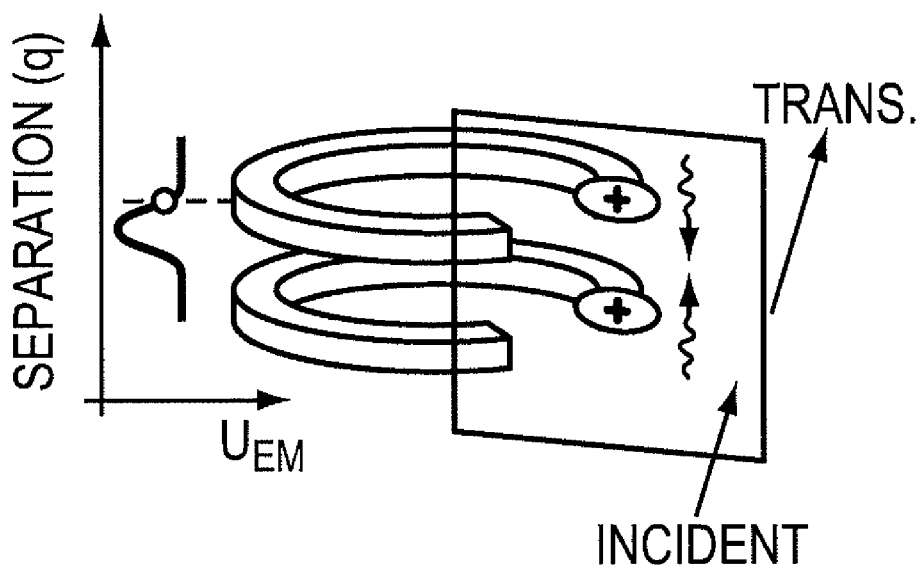
Figure 4D:
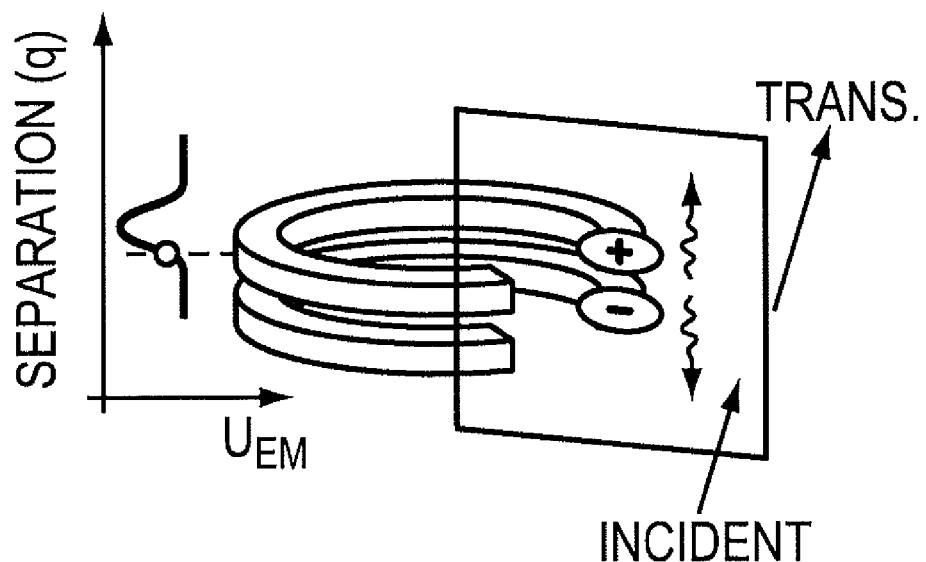

A decrease of the distance q typically results in an increased coupling strength $\kappa$, which translates into a frequency decrease for the symmetric supermode and a frequency increase for the anti-symmetric supermode. Further, a positive frequency shift ($\delta\omega>0$) increases the energy of the system 400, and a negative shift ($\delta\omega<0$) lowers the energy of the system. Therefore, the excitation of a symmetric mode may result in attractive forces, as illustrated in FIG. 4C, while the excitation of an anti-symmetric mode (with a frequency shift of opposite sign) may result in a repulsive force, as illustrated in FIG. 4D.

FIGS. 5A-5C illustrate computed symmetric and anti-symmetric TE-like guided modes in a dual-microring resonator. FIG. 5A shows a cross section through the two microrings 402, 404. For this simulation, the refractive indices of the core and cladding are chosen to be 3.5 and 1, respectively. The microrings have a width w=500 nm, a height t=200 nm, and a distance q=250 nm. The computation is carried out for a wavelength of 1.55 μm. FIGS. 5B and 5C show the x-component of the electric field in the cross section for a symmetric mode and an anti-symmetric mode, respectively.

In the context of dielectric waveguides and cavities, a change in frequency relates to a change in the effective index ($\delta n$) and to the group index ($n_g$) of the waveguide mode via the relation $\delta\omega/\omega = -\delta n/n_g$. Since the frequencies of the supermodes change as a function of the distance q between microrings 402, 404, the effective indices are dependent on q as well. In the symmetric waveguide configuration of FIGS. 5A-5D, the effective indices of the coupled guided modes (i.e., supermodes) are $n_\pm = n_{o\pm}\kappa(q)$, as computed through first order coupled mode theory. Herein, the symmetric mode corresponds to $n_+$ while the anti-symmetric mode corresponds to $n_-$. The coupling strength $\kappa(q)$, takes on an exponential dependence with the microring separation. FIG. 5D illustrates the resulting computed effective index versus waveguide separation, which is characterized by symmetric splitting between the symmetric and antisymmetric modes with increasing $\kappa$ (or decreasing q). An index change $\delta n>0$ corresponds to an attractive force, and an index change $\delta n<0$ corresponds to a repulsive force.

FIGS. 6A-6C illustrate how the attractive and repulsive forces associated with the supermodes of the coupled resonator system 400 may be used to generate an optical potential. In FIG. 6A, the frequencies of symmetric and antisymmetric supermodes 600, 602 for two modes of the un-coupled resonators (m=n and m=n+1) are plotted as a function of the coupling strength $\kappa$. Initially, as the microrings are infinitely far apart, i.e., as the coupling strength $\kappa$ is zero, the ring cavity modes are un-coupled and degenerate (i.e., at the same frequency). However as the rings are brought closer together, resulting in larger coupling strengths $\kappa$, the two resonant modes of the (n)th (indicated by $\omega_n$ on the x-axis) and (n+1)th (indicated by $\omega_{n+1}$ on the x-axis) cavity modes split in frequency. This is illustrated by two lines 600, 602 emanating from the x-axis. The anti-symmetric modes (602) shift to higher frequencies with increasing coupling strength, while the symmetric ring modes (600) shift to lower frequencies. As the coupling between the microrings becomes large enough (or the separation between them becomes small enough), the symmetric and anti-symmetric modes 600, 602 produced by adjacent orders may cross at some point 604.

The behavior of the system 400 upon excitation with a monochromatic laser or other light source at a fixed frequency $\omega_L$ is illustrated in FIGS. 6B and 6C with respect to the dotted line in FIG. 6A. FIG. 6B illustrates the mechanical forces produced by the system as the separation between the rings (and the corresponding coupling (K) between the rings) evolves. At a position 620 corresponding to large distances between the microring resonators, the coupling between the microrings tends towards zero (i.e., the separation tends towards infinity). Consequently, the resonators are at their natural frequencies, $\omega_n$ and $\omega_{n+1}$, and are detuned from the laser frequency $\omega_L$. In this case, there is effectively no power in the resonant modes, and neither attractive nor repulsive forces are generated by the rings. As the ring separation decreases (or coupling strength increases), the system reaches, at a position 622, resonant excitation of the symmetric mode 600 of the (n+1)th resonance, which results in mutual attractive forces between the microrings. Further decrease in the separation between the rings leads to the excitation of the anti-symmetric resonance from the (n)th ring mode at position 626. At this coupling strength, the forces between the microring resonators are repulsive. Between the two positions 622, 624 at which the system is in resonance with either of its supermodes, the force goes through zero. Finally, as the ring separation decreases even further, the system reaches position 626, at which point the laser line is again detuned from the resonances of the system (i.e., no forces are produced between the rings).

In some embodiments, the coupling strength ($\kappa$) between the two microrings may be large enough to tune the structure across multiple resonance orders. For instance, a microring with the cross-section shown in FIG. 5A (consistent with a group index $n_g \cong 4$) and a radius of 2.5 μm possesses a free spectral range (FSR), $\omega_{n+1} - \omega_n$ of about 4.5 THz (corresponding to about 40 nm at a center wavelength $\lambda=1550$ nm). It may be feasible to tune the cavity resonance through a frequency range of greater than 45 THz. In this strong coupling regime, degenerate crossing of the symmetric and anti-symmetric modes from different resonance orders may occur, i.e., at one excitation wavelength, the coupled system may have multiple resonances at different respective microring separations.

As shown in FIG. 6B, the configuration of system 400 results in large attractive and repulsive forces very locally in space upon excitation of the resonant modes. At the resonances 622, 624, the magnitudes of the forces reach local maxima. By integrating the force of FIG. 6B, the corresponding potential can be calculated. FIG. 6C illustrates the mechanical potential as a function of the ring separation q. The potential forms a localized and deep potential with a width, defined between half-maximum values of the potential, which equals the difference between the microring separations q at positions 622 and 624, respectively. The minimum of the potential well determines a unique distance q between the microring resonators 402, 404 at which the system is in a stable mechanical equilibrium. This property enables the manipulation of the mechanical system by means of all-optical forces. The mechanical configuration, in turn, changes the optical response of the system, leading to a fundamentally new means of controlling light with light, and adaptive control of cavity resonances through the formation of spectrally bound states between cavity resonances and the frequency of the impinging light.

Figure 7:
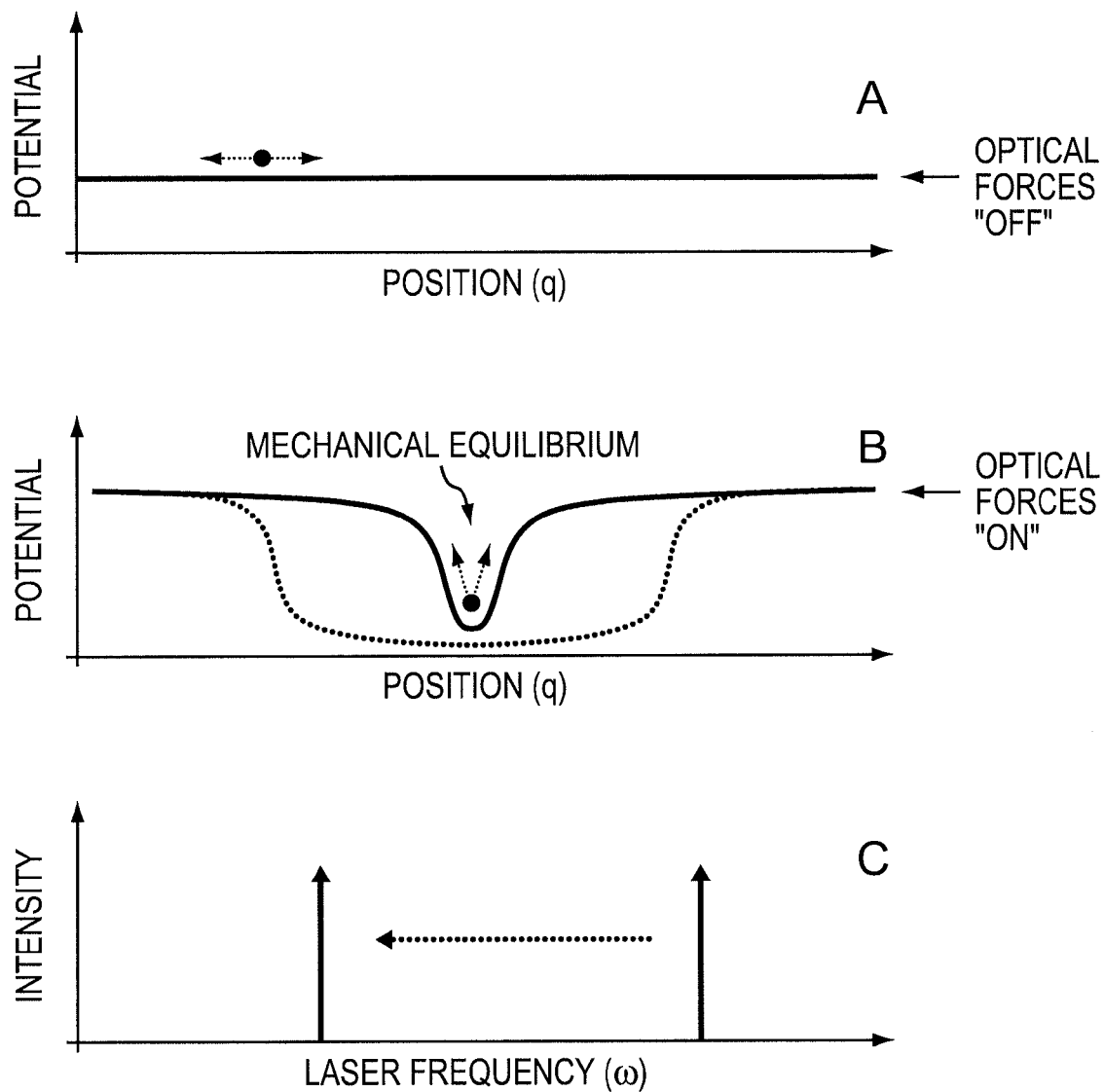
FIGS. 7A-7C are schematic diagrams illustrating the dependence of the width of an optical potential on the excitation wavelength according to some embodiments of the invention.

The relationship between the wavelength of light coupled into an optomechanical system, such as system 400, and the optical potential generated thereby is further explained in FIGS. 7A-7C. In the absence of optical excitations in the microring resonators 402, 404, the potential energy of the system due to optical forces does not depend on the distance q between the microrings, as shown in FIG. 7A. Therefore, the two microrings can freely move with respect to each other, up to limitations imposed by mechanical restoring forces, which are not considered in this figure, and may, in general, be designed to be weak in these systems. When the system is excited with, e.g., a continuous-wave laser line, blue-detuned from (i.e., at higher frequency than) a resonance-crossing 604, a potential well forms (FIG. 7B). As the frequency of the incident light moves towards the crossing, as illustrated in FIG. 7C, the potential well becomes narrower. By exciting with light at a frequency only slightly blue-detuned from a resonance-crossing, the system may be "trapped" in the potential well.

Figure 8A:
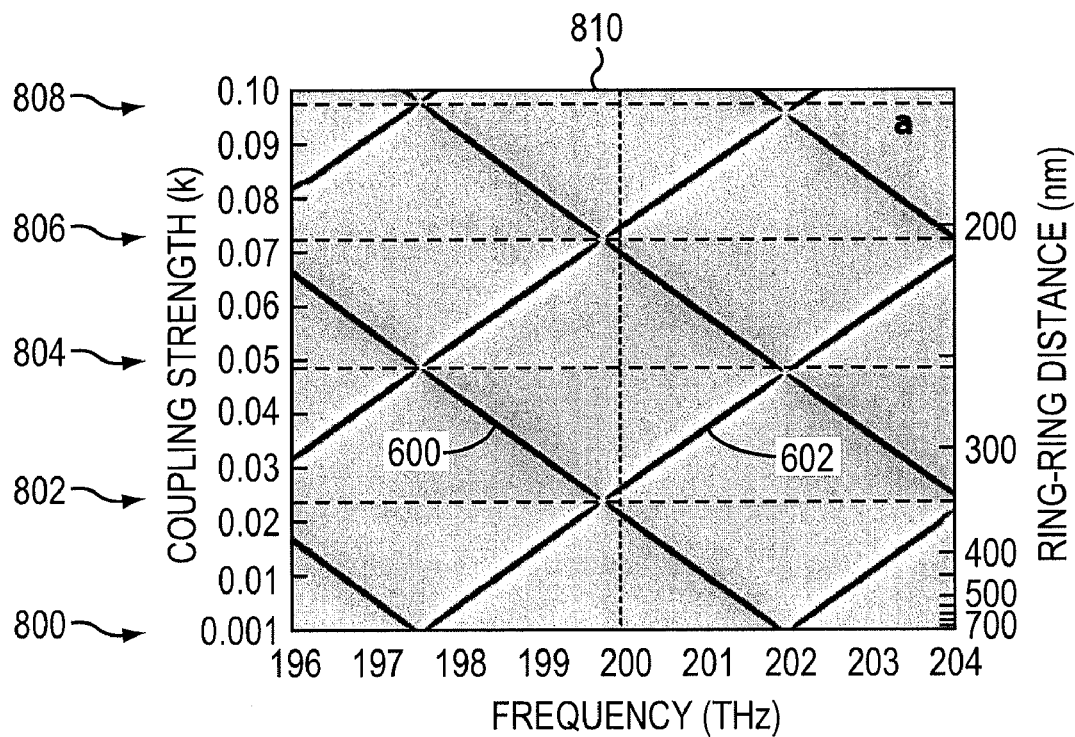
FIG. 8A is a graph illustrating resonance crossings according to an embodiment of the invention.

FIGS. 8A-8G show modes and optomechanical potentials for an optomechanical system with two coupled microring resonators, computed using spatial coupled mode theory and scattering matrix formalisms. The ring circumference L in this example is 16 μm, and the cross-sectional dimensions are the same as in FIG. 4. The fractional power coupling from the bus waveguide 406 into the microring 402 is set to 10%. FIG. 8A illustrates, similarly to the generic FIG. 6, the frequencies of the symmetric and anti-symmetric modes 600, 602 as a function of the coupling strength κ. Each row of resonance crossings 800, 802, 804, 806, 808 occurs for an integer difference in resonance order of the symmetric and anti-symmetric mode. For example, row 802 corresponds to a difference of one order between the symmetric mode (n+1) and anti-symmetric mode (n), and row 804 corresponds to a difference of two orders between the symmetric mode (n'+2) and the anti-symmetric mode (n'). The spectral line width of each mode is determined by the external coupling to the bus waveguide. However, the spatial resolution of the trapping potential produced by this system is not limited by the line width of the individual resonator modes because, for frequency detunings from the resonance smaller than the line width, interference of the symmetric and anti-symmetric resonances gives rise to a narrow line width supermode.

Figure 8B:
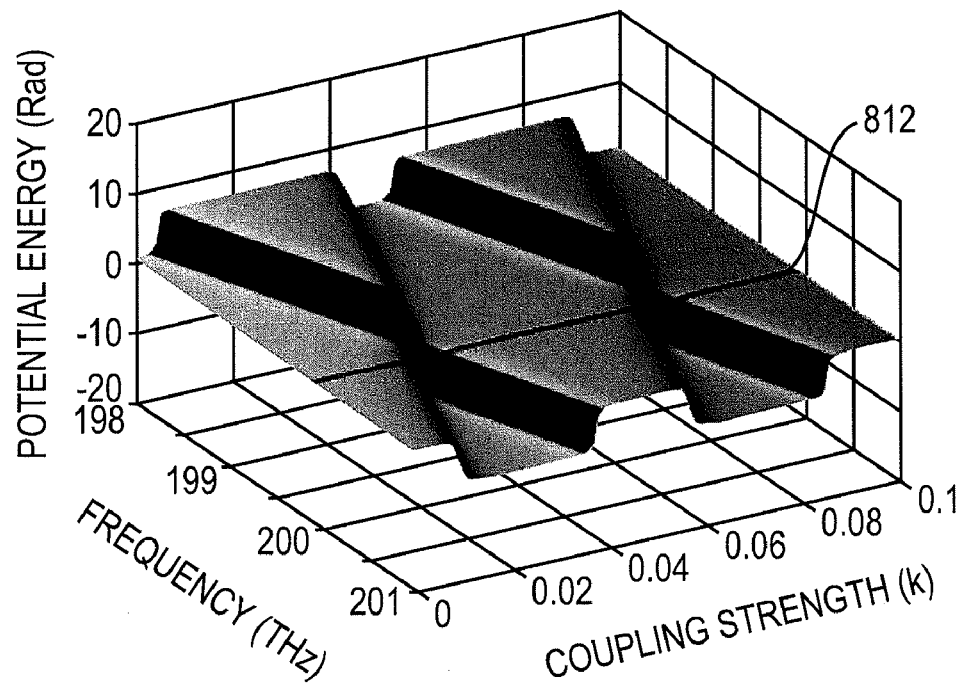
FIGS. 8B-8G are graphs illustrating optical potential wells resulting from co-localized forces according to an embodiment of the invention as a function of coupling strength and excitation frequency.

The computed normalized potential energy is plotted as a function of κ and ω in FIG. 8B. If a laser excitation is assumed to be blue-detuned from the cavity mode-crossing (e.g., ω=200 THz, indicated by a vertical line in FIG. 8A), the effective potential follows the solid black line on the surface plot of FIG. 8B. Minima of the potential occur at frequencies blue-detuned from the resonance crossing. This means that the opto-mechanical system will be trapped at discrete locations in space, effectively pinning the opto-mechanical system at a position q mid-way between the symmetric and anti-symmetric resonances (i.e., exciting the symmetric and anti-symmetric resonances equally).

Figure 8C:
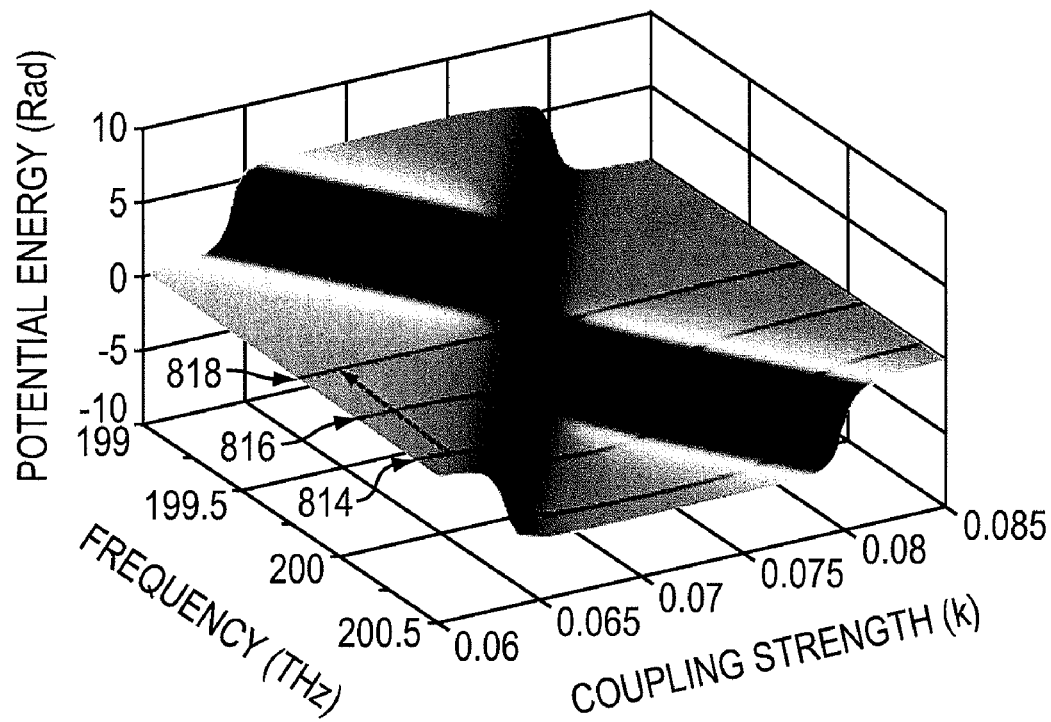
Figure 8D:
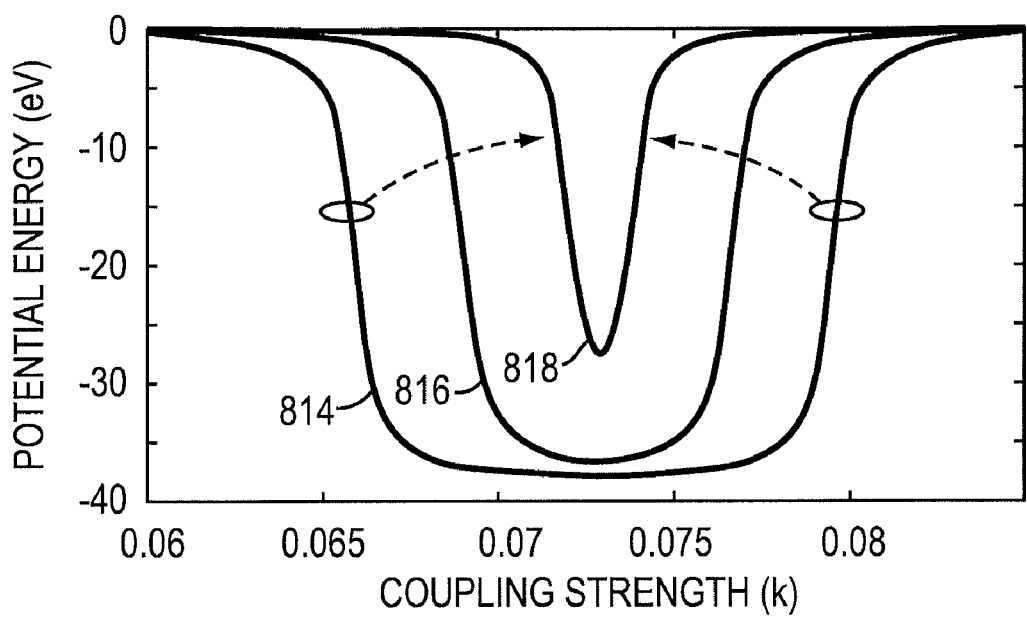

Moreover, if a single laser line is swept continuously in frequency toward the resonance crossing, the potential may be adiabatically varied from a wide square-well to a δ-function, as illustrated in FIG. 8C with three snapshots of the potential well 814, 816, 818, illustrating the trajectory of change of the potential corresponding to three successively smaller frequency detunings. This facilitates "corralling" the system to one of several localized positions in space, corresponding to different resonance orders of the microrings. The shapes of the potential 814, 816, 818 along the wavelength tuning trajectory at the three different wavelengths are plotted in FIG. 8D for a realistic guided power of 1 mW within the bus waveguide 406 (i.e., $\Phi \approx 10^{16}$ photons/sec). At this power level, the depth of the potential well is tens of electron volts (eV).

Figure 8E:
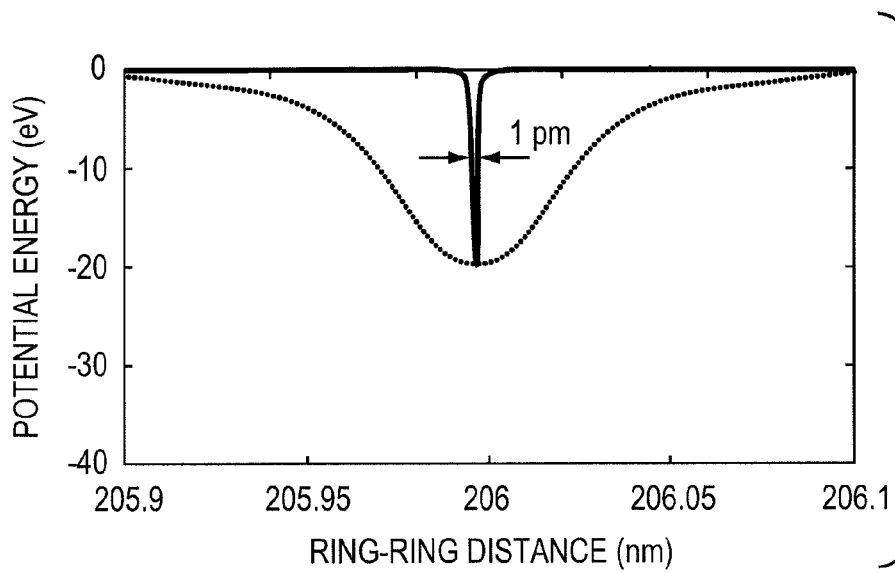
Figure 8F:
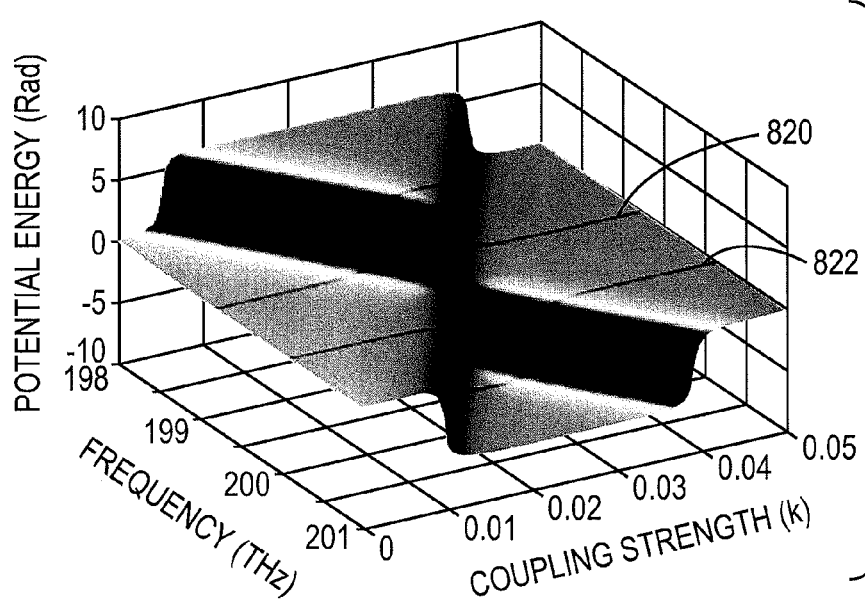

In the limit of small detuning from the resonance crossing, the spatial localization of the trapping potential scales to arbitrarily narrow values. For example, FIG. 8E shows that the width of the trapping potential shrinks to 1 picometer in space as the detuning from the resonance crossing approaches zero. This high level of spatial localization is a result of interference of the two resonance modes. As the mode crossing is approached and the trapping potential narrows, the finite linewidth of the resonator modes leads to a shallowing of the potential. However, the potential does not vanish at the crossing, but asymptotically approaches a depth of half its depth at large detunings.

Figure 8G:
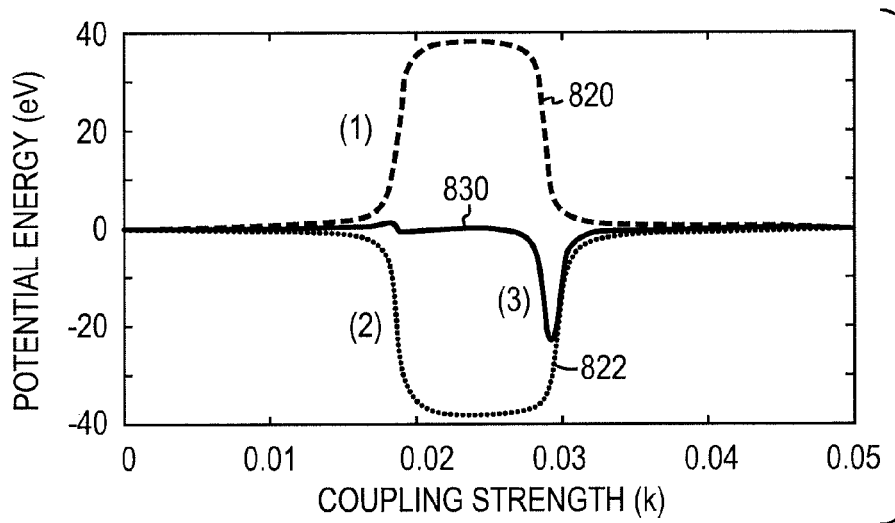

The resonator modes may be manipulated in a more arbitrary fashion when two independent laser lines are employed. For instance, if laser lines are placed asymmetrically about the resonance-crossing, as illustrated by trajectories 820, 822 on the potential surface map of FIG. 8F, the potential experienced by the cantilever will be a result of both laser lines. The total potential 830 is shown in FIG. 8G. It exhibits a unique minimum for κ=0.028 (or q≈350 nm). This trapping scheme exploits asymmetries in the potential as a function of coupling strength, resulting from a gradual wavelength dependence of the coupling strength κ. In various embodiments, the resonance frequency of the system may be pinned to a desired frequency within a continuous frequency range. Since the trapping potential may correspond to a dimension of about 1 pm in space, a cantilever or membrane which suspends this ring will be stabilized to this subatomic positional level. As one application, this mechanism enables direct tuning and manipulation of the excited resonator with a high degree of stability. This is important because it has been noted that optical tuning by structural perturbation in nanophotonic structures may require nanometer-to-picometer levels of control, making other (electro-mechanical) means of control very difficult to implement.

In various embodiments, the depth of the optical potential may be greater than $k_B T$ (~25 meV), meaning that thermal fluctuations are not sufficient to liberate the trapped microring from this remarkably localized potential. Moreover, forces corresponding to these potentials are large (1-10 μN) compared with gravitational forces (~nN) and the restoring forces typically generated by micron-scale cantilevers and membranes. Short-range interactions such as Van-der-Waals and capillary forces need not significantly affect the operation of such devices if the distance q between interacting surfaces is kept greater than tens of nanometers. While such short-range interactions could dominate for smaller distances, they typically diminish to force levels on the order of nano-Newtons for non-polar materials at these length scales. Therefore, it is feasible to control the perturbing structure with only optical interactions, since these can dominate in experimentally realistic situations.

An exemplary optomechanical system 900 having the topology illustrated in FIGS. 2A-2C is depicted in FIGS. 9A-9F. The system 900 generally includes two photonic devices 102, 104 that can be moved with respect to each other. Each device includes two or more SCPSs. For example, with reference to FIG. 9A, a first SCPS 902 of the first photonic device 102 may be a waveguide, and a second SCPS 904 of the first photonic device 104 may be an optical resonator, such as a microring resonator. An additional waveguide 906 in the first photonic device 902 may provide an optical input port that is optically coupled to the first and second SCPSs. A third SCPS 908 and a fourth SCPS 910 contained in the second photonic device 104 may likewise be a waveguide and an optical resonator, respectively. Alternatively, the fourth SCPS may, for example, include a dielectric structure, a semiconductor structure, a plasmonic structure, and/or a metal structure. Referring again to FIG. 9A, within each photonic device, the waveguide and optical resonator are at fixed positions. The waveguide 908 of the second device 104 may be optically coupled to the waveguide 902 of the first device 102, and, similarly, the optical resonator 910 of the second device may be optically coupled to the optical resonator 904 of the first device. Further, the corresponding structures of each optically coupled pair of SCPSs may share the same or similar geometry and dimensions, which may be advantageous for achieving high coupling strengths, and especially for achieving symmetry that allows proportional changes of coupling strengths (and associated forces) with changes in displacement.

Figure 9E:
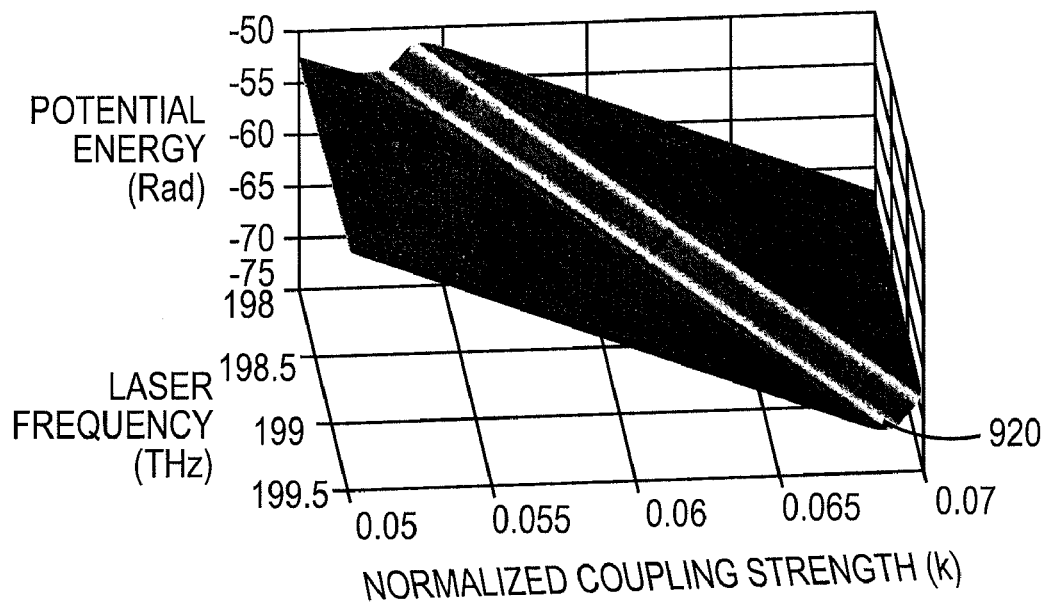
FIGS. 9E-9F are graphs illustrating optical potential wells resulting from non-co-localized forces according to an embodiment of the invention as a function of coupling strength and excitation frequency.

The system 900 may adapt its resonance frequency to follow a single incident laser line—all-optically, as illustrated in FIGS. 9B-9F. The laser may excite an optical mode in the input port of the additional waveguide 906, which may couple the laser light into the first and second SCPSs 902, 904 of the first photonic device 102. Optionally, the laser light may also directly couple into the second photonic device 104. A mutual optical force between the optical resonators 904, 910 may result from a resonant supermode analogous to the supermodes created in system 400 and described in detail above. Over certain ranges of laser frequencies and coupling strengths κ, it is possible, in some embodiments, to excite only the anti-symmetric mode of the dual-ring resonator, resulting in a repulsive step-like potential (FIG. 9B). Furthermore, the laser light may serve to excite a non-resonant dual-waveguide mode in the coupled waveguides 902, 908, which may be associated with an attractive potential, as illustrated in FIG. 9C, and a corresponding attractive force between the two waveguides 902, 908. The attractive force between the two waveguides may monotonically increase with the distance q between them.

When resonant and nonresonant optically coupled SCPSs are combined in a system 900 such that the separation between both pairs of coupled structures move synchronously, the optomechanical potential of the system is the sum of the potentials formed by the individual coupled structures. For example, the combination of the resonant repulsive potential formed by the dual ring system (FIG. 9B) and the non-resonant attractive potential formed by the dual waveguides (FIG. 9C) may lead to a potential with a localized minimum, as illustrated in FIG. 9D. Such a potential results if at a first, greater distance between the two photonic devices 102, 104, the attractive force between the waveguides 902, 908 is greater in magnitude than the repulsive force between the optical resonators 102, 104, and at a second, smaller distance between the photonic devices, the repulsive force between the optical resonators is greater in magnitude than the attractive force between the waveguides. In some embodiments, the potential minimum is on resonance with, or nearly on resonance with, the incident monochromatic light.

Figure 9F:
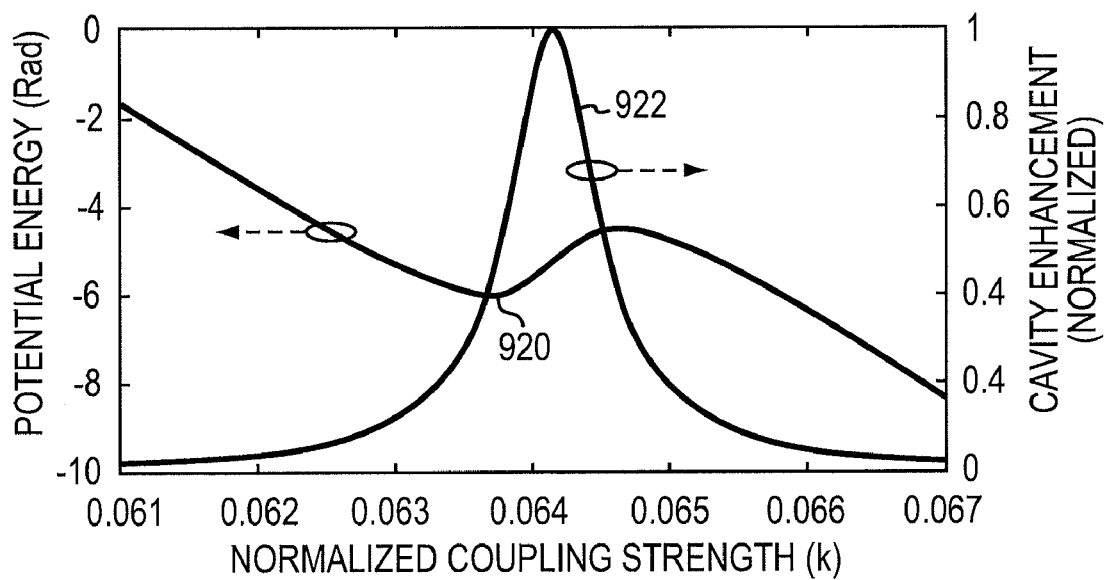

The normalized effective optomechanical potential for an exemplary system 900 (computed for a coupling fraction of 10% and length of the dual waveguides of 100 μm) is shown as a surface plot in FIG. 9E for a range of frequencies and coupling strengths. Herein, the shape of this trapping potential is preserved as the frequency of the excitation is varied. Moreover, the detuning of the equilibrium resonance frequency of the system from the incident laser line is a constant for all choices of laser frequencies shown in FIG. 9E. Such a system may be achieved if the exponential dependence of the waveguide and microring coupling strengths, κ(q), are engineered to be substantially the same. In this case, the trapping potential may be translated spectrally over a range of laser frequencies in a continuous fashion while the resonant frequency alignment with the anti-symmetric mode may be maintained. FIG. 9F illustrates the relative frequency misalignment between the potential minimum 920 and the resonance 922 of the resonator system. The end result is a resonator which tracks the incident laser line because it is energetically favorable to do so.

Figure 10:
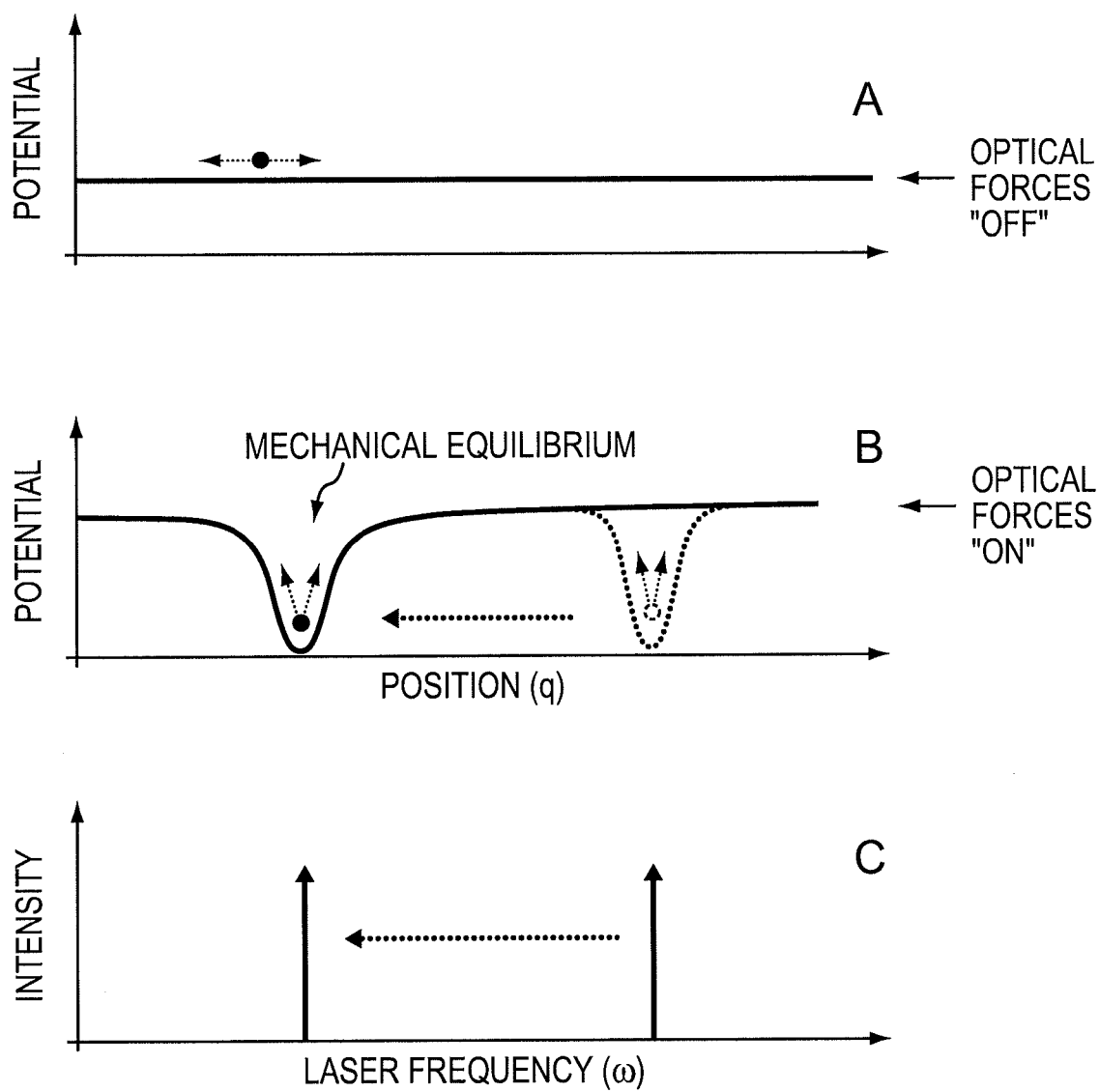
FIGS. 10A-10C are schematic diagrams illustrating the dependence of the position of an optical potential on the excitation wavelength according to some embodiments of the invention.

FIGS. 10A-10C illustrate the effect of the wavelength of light coupled into the photonic devices 102, 104 on the optical potential well. Again, if no optical mode is excited, the optical potential is flat (FIG. 10A), and the system has no stable equilibrium. When monochromatic light is coupled into the system, a potential well forms of the combined attractive and repulsive optical forces, resulting in an equilibrium distance between the first photonic device and the second photonic device. As the frequency of the excitation varies, so does the equilibrium distance (FIGS. 10B and 10C). Defining, again, the first and second distances as the distances between the two photonic devices at which the total optical force, i.e., the sum of the optical force between the first and third SCPSs and the optical force between the second and fourth SCPSs, has a locally maximal magnitude, the average of the first and second distances (i.e., the equilibrium distance) may depend monotonically on a wavelength associated with the optical mode in the input port.

In some embodiments, the function of the coupled optical resonators and the coupled waveguides may be exchanged, i.e., a symmetric supermode may be excited in the dual-resonator structure, resulting in an attractive force, and a non-resonant anti-symmetric mode in the dual-waveguide structure may create a repulsive force. If the attractive force dominates at larger, and the repulsive force dominates at smaller distance between the photonic devices 102, 104, a potential minimum similar to that shown in FIG. 9D is achieved.

An optomechanical system 900, in which a potential well induced by an optical excitation generates a bound optomechanical state that tracks the resonance of the system may be advantageously applied in various contexts. For example, the system may be used as a self-aligning resonator in the beam of a tunable laser, e.g., a continuous-wave laser. When the system 900 is placed at the laser output, outside the laser cavity, it may serve as a filter for noise resulting from broadband amplified spontaneous emission (ASE), allowing for a high-purity laser source with a simple construction.

Figure 11A:
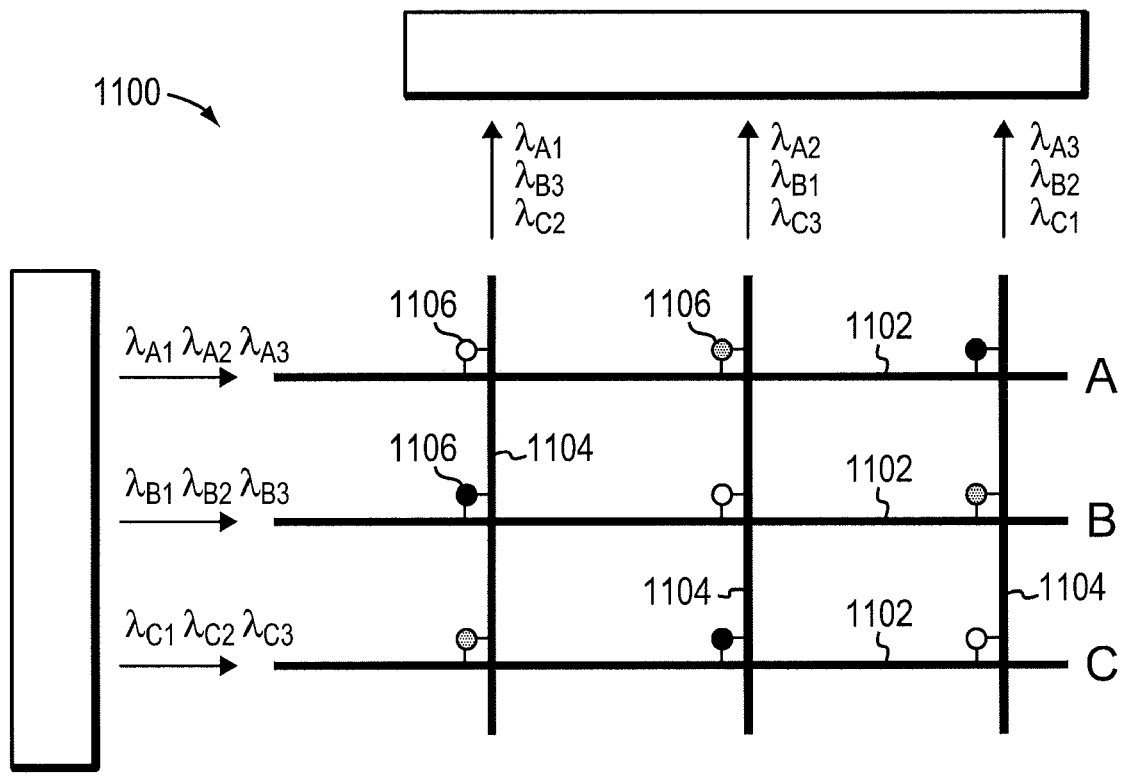
FIGS. 11A-11B are schematic diagrams illustrating an optical communication system containing add-drop filters.

FIGS. 11A-11F illustrate an application of self-aligning resonators in optical filter designs, such as, e.g., add-drop filters for optical communication systems. FIG. 11A depicts an optical cross-connect 1100 including a number of input waveguides 1102, a number of output waveguides 1104, and an array of channel add-drop filters 1106 at the crossing points, illustrating state-of-the-art technology. The filters 1106 on any one of the input or output waveguide 1102, 1104 typically, but not necessarily, all have passbands at different wavelengths. In some applications, two or more filters may be at the same wavelength.

Figure 11B:
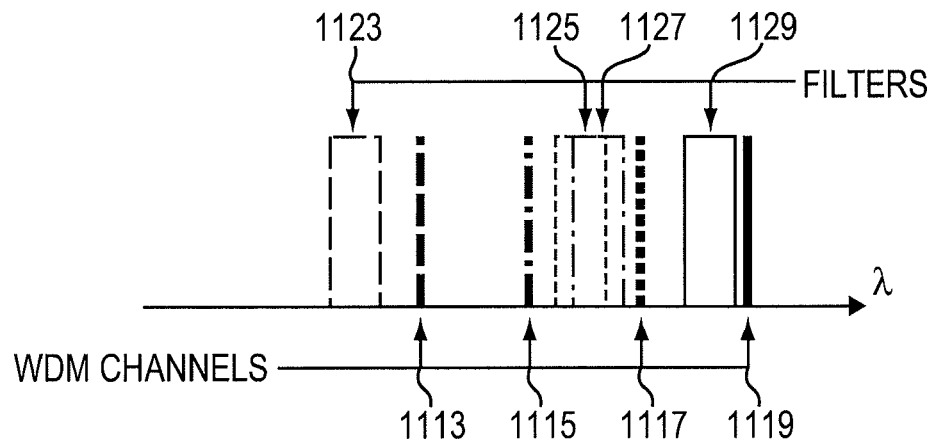

FIG. 11B illustrates a wavelength-division multiplexed (WDM) optical spectrum, including signals at four wavelength channels 1113, 1115, 1117, 1119, that may be incident on the optical cross-connect 1100 of FIG. 11A in any input waveguide 1102; and an exemplary poor wavelength alignment of the passbands, depicted as boxes 1123, 1125, 1127, 1129, of the channel add-drop filters 1106 disposed on that horizontal waveguide to the corresponding channel grid. The poor wavelength alignment is due to large sensitivity of high-index contrast integrated photonic waveguides and resonators to dimensional error in fabrication, such as width or thickness of the waveguide, as well as to thermal variations (which may change in time in microseconds in a system like a microprocessor, or over minutes or hours in a telecom application in the field—e.g. on a telephone pole).

Figure 11C:
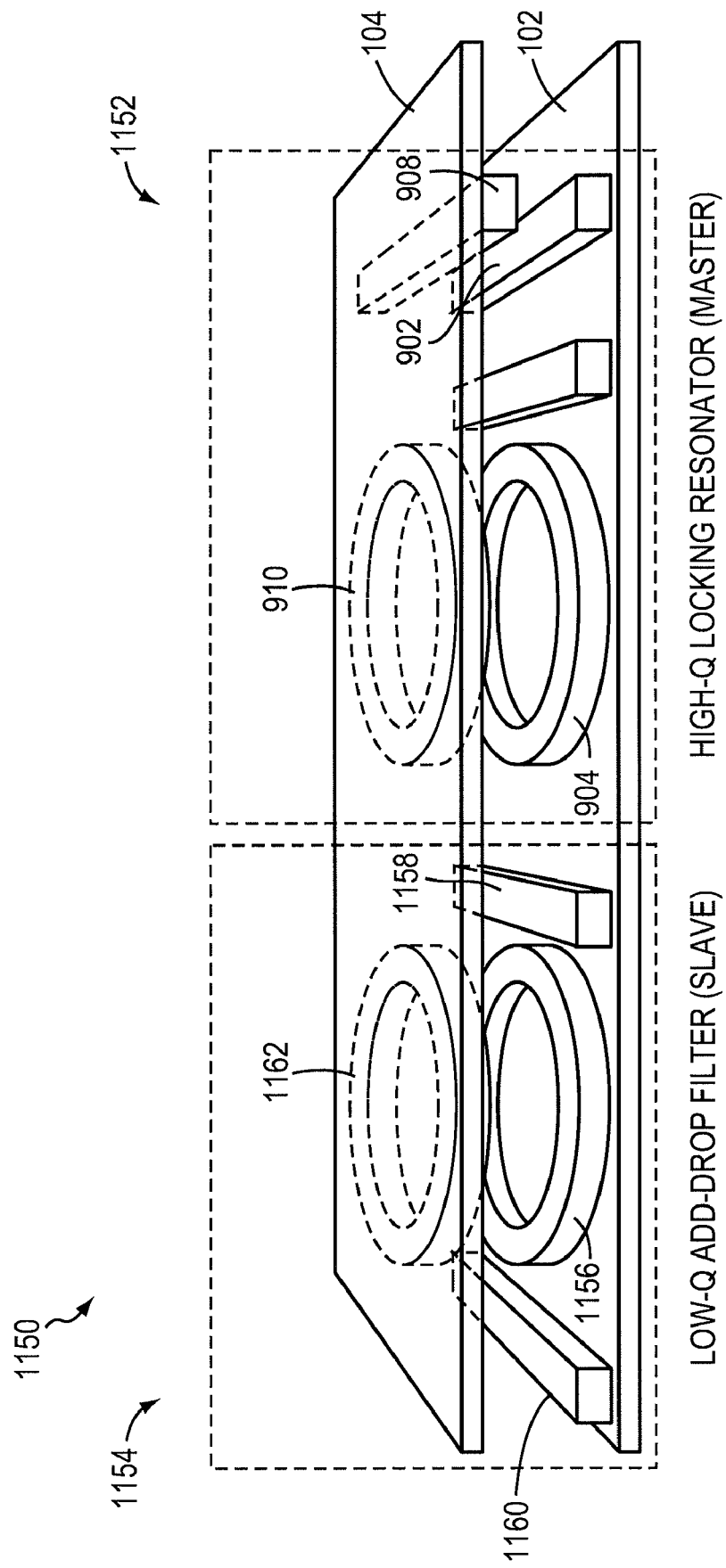
FIG. 11C is a schematic diagram depicting a master-slave configuration of a self-aligning resonator and an optical filter according to an embodiment of the invention.

Referring to FIG. 11C, in one embodiment, a master-slave optical filter system 1150 is optomechanically lockable to an optical frequency reference. The system 1150 includes a high-Q, narrow-band, self-aligning resonator 1152, performing the function of a locking resonator (the "master"), and a low-Q, resonant optical filter 1154, performing the role of an add-drop filter in the cross-connect (the "slave"). In some embodiments, the locking resonator 1152 has a bandwidth of no more than 10 GHz, preferably no more than 1 GHz. The optical filter 1154 may have a wider bandwidth, preferably 20 to 100 GHz for telecom applications. In certain embodiments, the bandwidth of the optical filter may be lower (e.g. 1-10 GHz) or higher (e.g. 200 GHz or more). The self-aligning resonator may be an optomechanical system 900, having a pair of coupled waveguides 902, 908, and a pair of, e.g., coupled microring resonators 904, 910. The optical filter may include an optical resonator 1156, e.g., a microring resonator, input and output waveguides 1158, 1160 optically coupled to the optical resonator 1156, or alternative means for providing an optical filter input port and an optical filter output port, and an SCPS 1162 optically coupled to the optical resonator 1156. The SCPS 1162 may be, but need not be, an optical resonator itself. The optical coupling between the optical resonator 1156 of the "slave" 1154 and the optical filter input port may, generally, be stronger than the optical coupling between the optical resonator 904 of the "master" 1152 and the input port of the "master" 1152. The optical resonator 1156 is located at a fixed position with respect to the first photonic device 102 of the master 1154. Likewise, the SCPS 1162 is fixed with respect to the second photonic device 104 of the master. In some embodiments, the first photonic device 102 and the optical resonator 1156 may be patterned into the same wafer or substrate, as may the second photonic device 104 and the SCPS 1162.

Figure 11D:
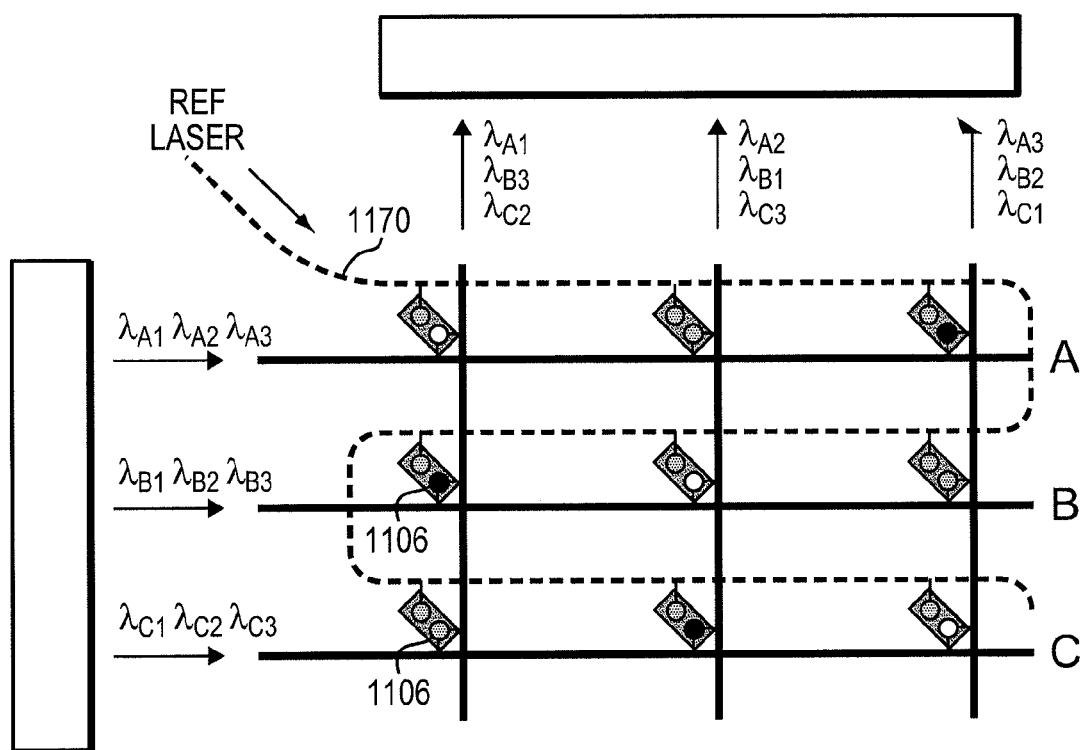
FIGS. 11D-F are schematic diagrams illustrating an optical communication system containing add-drop filters in the master-slave configuration of FIG. 11C.

FIG. 11D illustrates an optical cross-connect 1100 whose filter array is optomechanically lockable to an absolute optical frequency reference 1170 in accordance with an embodiment. In other words, a resonance of an optical filter 1106 of the array depends on a resonance of the master 1152. In particular, the difference between the resonance frequencies of the slave 1154 and the master 1152 may be fixed. The filters 1106 in the cross-connect 1100 each comprise an optomechanically lockable filter 1154 of FIG. 11C. If the filter passbands are at different wavelengths, then the add-drop filter in each optomechanically lockable filter is detuned in resonance frequency from its locking resonator 1152 by a different amount, so that, when all locking resonators 1152 in the array lock to an optical frequency reference 1170, the filters are spaced along the wavelength channel grid.

Figure 11E:
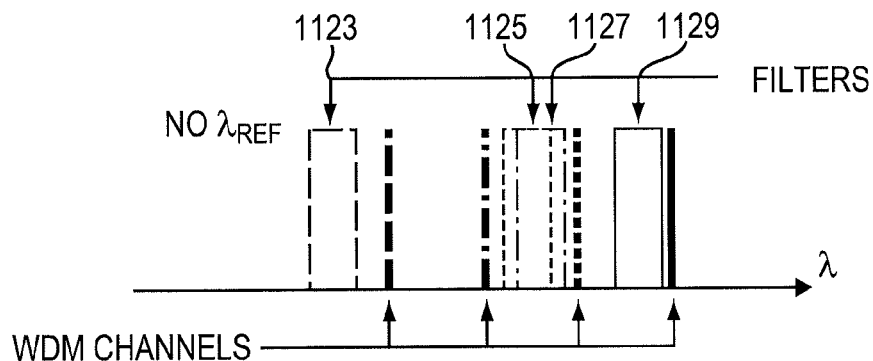
Figure 11F:
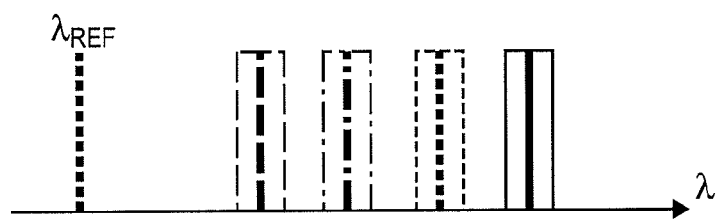

FIG. 11E illustrates the wavelength channel grid of the optical cross-connect 1100 of FIG. 11D, as well as exemplary filter passband positions 1123, 1125, 1127, 1129 when the optical reference laser is turned off, showing degraded wavelength alignment due to large sensitivity to dimensional errors of integrated photonic filters. FIG. 11F illustrates an exemplary wavelength channel grid and filter passband alignment, showing that turning on the optical wavelength reference 1170 locks the locking resonators' resonance frequency to the incident laser signal. As a result, the filter passbands follow the locking resonator because they are mechanically coupled, and are aligned to the desired wavelength grid. Designing and realizing a resonator-based filter with an absolute resonance frequency of a particular value is difficult due to large dimensional, and potentially thermal, sensitivities of strong-confinement resonators. However, the realization of resonant filters 1154 with an accurate fixed relative frequency difference from an adjacent locking resonator 1152 of similar dimensions is readily achievable with present fabrication technology. Absolute dimensional errors will shift both resonators, but their dimensional errors (and thermal shifts) may be about the same because of their physical proximity. Therefore, this approach circumvents the large absolute-sensitivity problem in strong-confinement resonators and integrated nanophotonic circuits.

In the preceding description of specific embodiments, coupled optical resonators have been illustrated as dual-microring structures. While microring resonators may have advantageous properties for many applications, embodiments of the invention may, generally, utilize a wide variety of optical resonators, including standing-wave resonators and traveling-wave resonators of various shapes, and with various input and output coupling mechanisms. Further, an optical resonator may, in itself, contain a plurality of optically resonating structures. Resonators may also be cascaded by connecting the input port of a second resonator to the output port of a first resonator, etc.

Figure 12A:
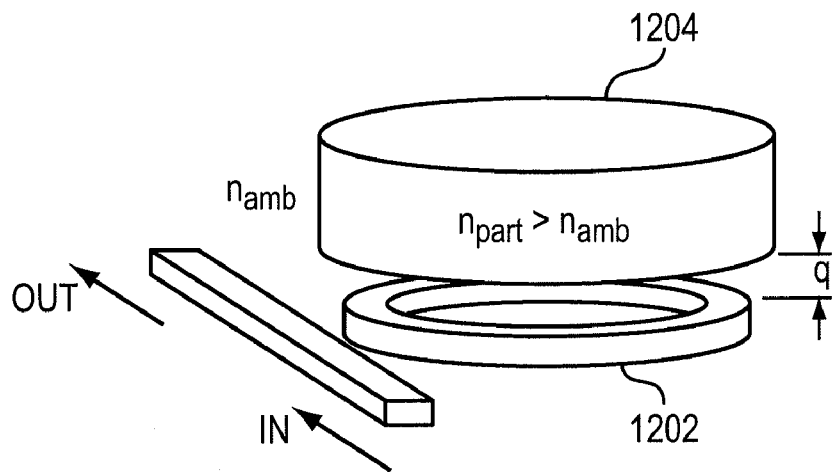
FIGS. 12A-12C are schematic diagrams illustrating a coupled optical resonator and perturbing structure, resulting in a mutually attractive force, according to some embodiments of the invention.
Figure 12B:
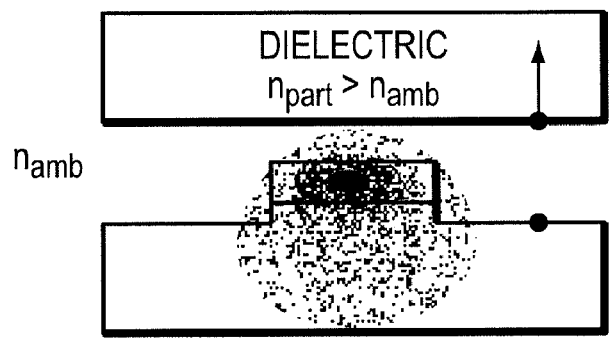
Figure 12C:
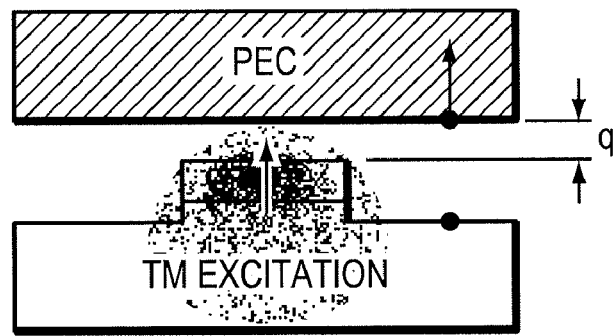

In some embodiments, an optical resonator, instead of being paired with another resonator, is optically coupled to a perturbing structure, such as a slab of dielectric material. For example, as illustrated in FIG. 12A, an optomechanical system may include an optical resonator 1202, and a perturbing structure 1204 including a perturbing medium. In FIG. 12B, the perturbing medium comprises a dielectric material, and has a refractive index $n_{pert} > n_{amb}$, wherein $n_{amb}$ is the refractive of the ambient medium (e.g., air). As the perturbing structure 1204 approaches the optical resonator 1202, the effective index corresponding to a resonant mode near an optical excitation wavelength increases, and the resonant frequency decreases, resulting in an attractive force. In FIG. 12C, the perturbing medium contains a metal or other electrically conductive material, and may employ an optical excitation polarized so that the optical field is primarily normally polarized to the perturbing structure in the region of interaction of the optical resonator 1202 and the perturbing structure 1204. Such a structure, by the concept of image charges, is equivalent to a two-cavity system with an excited symmetric resonant mode.

Figure 13A:
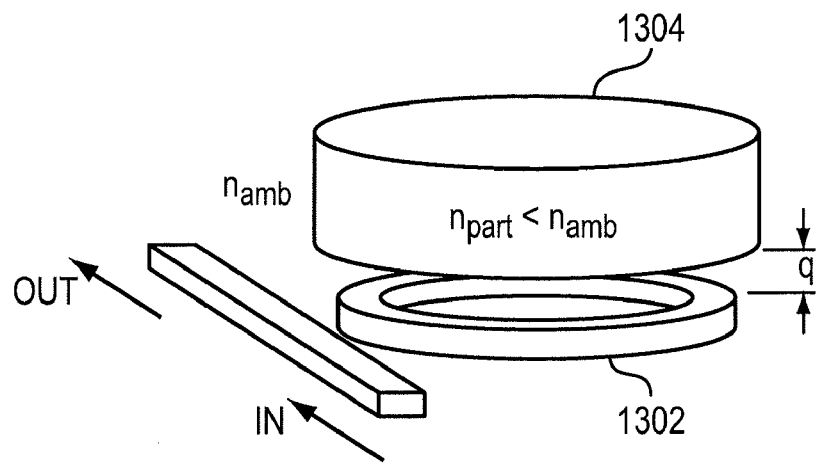
FIGS. 13A-13C are schematic diagrams illustrating a coupled optical resonator and perturbing structure, resulting in a mutually repulsive force, according to some embodiments of the invention.
Figure 13B:
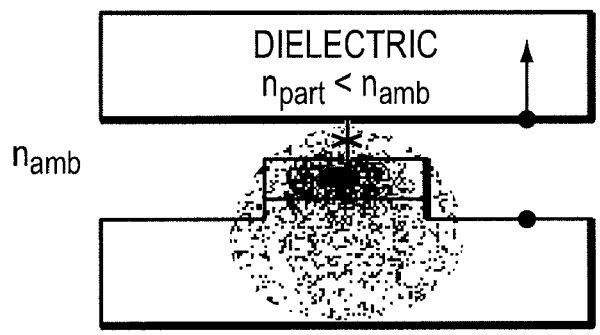
Figure 13C:
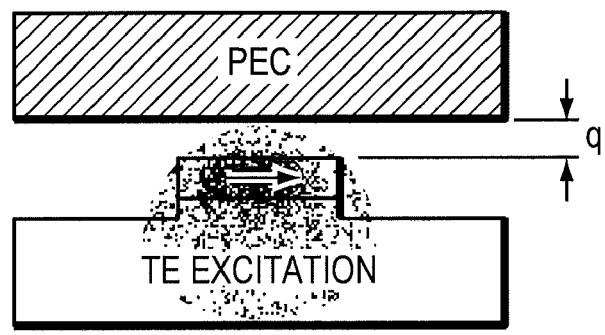

Referring to FIGS. 13A-13C, a repulsive optical force may be achieved by combining an optical resonator 1302 with a perturbing structure 1304 that contains a perturbing medium with a refractive index $n_{pert} < n_{amb}$ (FIG. 13A). As the distance between the perturbing structure 1304 and the optical resonator 1302 decreases, the effective index of a resonant mode near an optical excitation wavelength now decreases, and the resonant frequency increases, resulting in a repulsive force (FIG. 13B). Alternatively, a repulsive-force structure may, comprise a perturbing medium that is a metal or a conductor at optical frequencies, and may employ an optical excitation polarized so that the optical field is primarily tangentially polarized to the perturbing structure in the region of interaction of the optical resonator 1302 and the perturbing structure 1304, as illustrated in FIG. 13C. Alternatively, other configurations may be used that respectively simulate a symmetric or antisymmetric resonant mode of a 2-cavity coupled system. In some embodiments, a pair of SCPSs which are mutually attractive, as illustrated in FIGS. 12A-12C, may combined with a pair of mutually repulsive SCPSs, as illustrated in FIGS. 13A-13C, resulting in an optomechanical system 200 that may be functionally equivalent to the system 900 containing dual-microrings and dual-waveguides. In an embodiment, the combined pairs of SCPSs may be coupled to the same optical input source. Furthermore, they may be cascaded, so that the output of one device provides the optical input for the next.

Figure 14A:
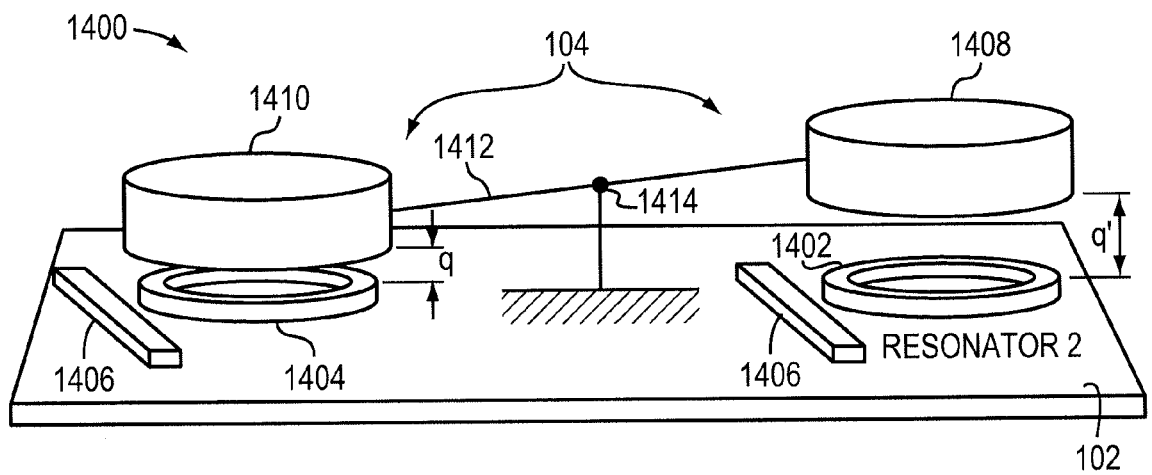
FIGS. 14A-14B are schematic diagrams depicting optomechanical systems utilizing only attractive or only repulsive forces according some embodiments of the invention.
Figure 14B:
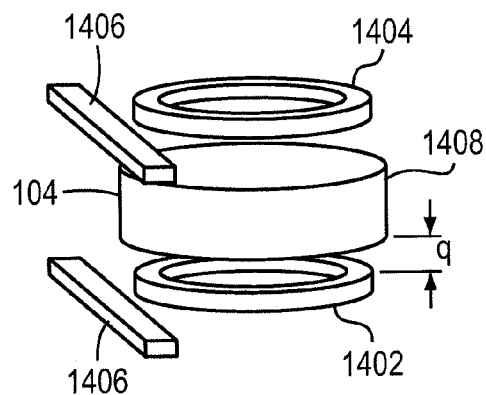

FIGS. 14A and 14B illustrate two exemplary embodiments of optomechanical systems that reach an equilibrium position as a result of two attractive or two repulsive optical forces. In FIG. 14A, this is achieved with a "teeter-totter" configuration. A first photonic device 102 of the system contains, for example, two microring resonators 1402, 1404, both mounted on the same substrate, and therefore non-movable with respect to each other. Light may be coupled into the microrings through waveguides 1406. The second photonic device may include two perturbing structures 1408, 1410, each being optically coupled to one of the mirorings 1402, 1404. The perturbing structures 1410, 1412 are rigidly mechanically coupled, e.g., supported by the same mechanical structure. For instance, they may be affixed to the ends of a rod or beam which is pivoted at a position 1414 elevated with respect to the plane of the microring resonators. Then, as the first perturbing structure 1408 moves towards its corresponding microring resonator 1402, the second perturbing structure 1410 moves away from its corresponding microring resonator 1404. Mechanical equilibrium can be achieved if the mutual optical forces between the microrings 1402, 1406 and the perturbing structures 1408,1410 are both attractive, or both repulsive. This embodiment is an example of an optomechanical system with a rotational, rather than translational, degree of freedom. In some embodiments, at small distances between the microrings 1402, 1406 and the perturbing structures 1408,1410, the motion of each perturbing structure can be approximated as linear.

In FIG. 14B, an alternative configuration using only attractive or only repulsive optical forces is shown. Here, the second photonic device 104 includes one perturbing structure 1408, located between two microring resonators 1402, 1404. The two microrings may be rigidly connected and optically coupled to each other, i.e., through an optical coupling between their respective input waveguides 1406, so as to render them part of the same photonic device. The perturbing structure 1408 is movably positioned; a decrease in its distance from one of the microrings implies an increase in the distance from the other microring by the same amount. Mechanical equilibrium is reached at a distance q from the first microring 1402 when the forces acting on the perturbing structure from both microrings balance.

Although the embodiments thus far have described engineering potentials along a single axis of motion, the described concepts may be used in embodiments producing forces along all three spatial axes. For example, potentials may be engineered to optically trap, or levitate, the perturbing structure in one dimension, and a second set of optical force-inducing SCPSs may be used to laterally trap or cause motion in the perturbing structure in the remaining two spatial dimensions. Such embodiments may provide optically powered micromotors and micromechanical wavelength converters.

Furthermore, the motion associated with the potentials and forces described has been linear motion between at least one resonator excited through a waveguide coupled in an all-pass configuration, and a perturbing structure. Rotary motion was illustrated in FIG. 14A. In general, the motion may be linear, shear, or rotary motion; or a combination.

Furthermore, the embodiments described show optical force manipulation and trapping of an optomechanical system where the optical forces dominate mechanical forces. For example, the perturbing structure may be nearly freely suspended. In other embodiments, fixed mechanical force transmitting structures may be incorporated in the optomechanical systems, such as levers and pulleys. Such structures may be integrated on a chip using similar to microelectromechanical-system (MEMS) fabrication technology.

The invention may be embodied in other specific forms without departing from the spirit or essential characteristics thereof. The foregoing embodiments are therefore to be considered in all respects illustrative rather than limiting on the invention described herein. Scope of the invention is indicated by the appended claims, and all changes which come within the meaning and range of equivalency of the claims are intended to be embraced therein.

What is claimed is:

1. An optomechanical system comprising:
   a first strong-confinement photonic device (SCPD);
   an optical input port optically coupled to the first SCPD; and
   a second SCPD optically coupled to the first SCPD and movably positioned with respect to the first SCPD,
   wherein (i) at least one of the first SCPD or the second SCPD comprises an optical resonator, (ii) an optical mode excited in the input port induces an optical force acting on the second SCPD, and (iii) at a first distance between a location in the first SCPD and a location in the second SCPD, the optical force points towards the location in the first SCPD, and, at a second distance between the location in the first SCPD and the location in the first SCPD, the optical force points away from the location in the first SCPD, the first distance being greater than the second distance.

2. The optomechanical system of claim 1, wherein the optical force (i) results from a coupling of an optical field in a first region comprising the location in the first SCPD with an optical field in a second region comprising the location in the second SCPD, and (ii) is attractive at the first distance and repulsive at the second distance.

3. The optomechanical system of claim 1, wherein
   the optical force comprises (i) a first force component resulting from a coupling of an optical field in a first region of the first SCPD comprising the location in the first SCPD with an optical field in a first region of the second SCPD comprising the location in the second SCPD, and (ii) a second force component resulting from a coupling of an optical field in a second region of the first SCPD and an optical field in a second region of the second SCPD, the first component being attractive at the first distance, and the second component being repulsive at the second distance, and
   a relative motion between the first region of the first SCPD and the first region of the second SCPD is parallel to a relative motion between the second region of the first SCPD and the second region of the second SCPD.

4. The optomechanical system of claim 1, wherein
   the optical force comprises (i) a first force component resulting from a coupling of an optical field in a first region of the first SCPD comprising the location in the first SCPD with an optical field in a first region of the second SCPD comprising the location in the second SCPD and (ii) a second force component resulting from a coupling of an optical field in a second region of the first SCPD with an optical field in a second region of the second SCPD, the first and second components being attractive, and a relative motion between the first region of the first SCPD and the first region of the second SCPD is antiparallel to a relative motion between the second region of the first SCPD and the second region of the second SCPD.

5. The optomechanical system of claim 1, wherein the optical force comprises (i) a first force component resulting from a coupling of an optical field in a first region of the first SCPD comprising the location in the first SCPD with an optical field in a first region of the second SCPD comprising the location in the second SCPD and (ii) a second force component resulting from a coupling of an optical field in a second region of the first SCPD with an optical field in a second region of the second SCPD, the first and second components being repulsive, and a relative motion between the first region of the first SCPD and the first region of the second SCPD is antiparallel to a relative motion between the second region of the first SCPD and the second region of the second SCPD.

6. The optomechanical system of claim 1, wherein at least one of the first SCPD or the second SCPD comprises at least one of a waveguide, an optical resonator, a plasmonic structure, a dielectric structure, or a semiconductor structure.

7. The optomechanical system of claim 1, wherein (i) a magnitude of the optical force is locally maximal at the first and the second distances, (ii) a mechanical coupling between the first SCPD and the second SCPD induces a mechanical force acting on the second SCPD, the mechanical force being smaller than the optical force at the first and second distances.

8. The optomechanical system of claim 1, wherein (i) a magnitude of the optical force is locally maximal at the first and the second distances, and (ii) a difference between the first and second distances depends on a wavelength associated with the optical mode.

9. The optomechanical system of claim 1, wherein (i) a magnitude of the optical force is locally maximal at the first and second distances, and (ii) an average of the first and second distances depends on a wavelength associated with the optical mode.

10. An optomechanical system comprising:

a first photonic device comprising (i) a first strong confinement photonic structure (SCPS), (ii) a second SCPS disposed at a fixed position with respect to the first SCPS, and (iii) an optical input port optically coupled to the first SCPS and the second SCPS; and a second photonic device comprising (i) a third SCPS optically coupled to the first SCPS, and (ii) a fourth SCPS disposed at a fixed position with respect to the third SCPS and optically coupled to the second SCPS, the second photonic device being movably positioned with respect to the first photonic device, wherein (i) an optical mode excited in the optical input port induces a first optical force between the first SCPS and the third SCPS and a second optical force between the second SCPS and the fourth SCPS, (ii) the first optical force is attractive and greater in magnitude than the second optical force at a first distance between the first photonic device and the second photonic device, and (iii) the second optical force is repulsive and greater in magnitude than the first optical force at a second distance between the first photonic device and the second photonic device, the first distance being greater than the second distance.

11. The optomechanical system of claim 10, wherein the first SCPS and the third SCPS each comprise a waveguide.

12. The optomechanical system of claim 10, wherein the second SCPS comprises an optical resonator.

13. The optomechanical system of claim 12, wherein the optical resonator comprises a microring resonator.

14. The optomechanical system of claim 10 wherein the fourth SCPS comprises a structure selected from the group consisting of an optical resonator, a dielectric structure, a semiconductor structure, a plasmonic structure, and a metal structure.

15. The optomechanical system of claim 10, wherein a sum of the first optical force and the second optical force has locally maximal magnitudes at the first and second distances.

16. The optomechanical system of claim 15, wherein an average of the first distance and the second distance depends monotonically on a wavelength associated with the optical mode.

17. The optomechanical system of claim 16, further comprising:

an optical filter including an optical resonator disposed at a fixed position with respect to the second SCPS of the first photonic device, an SCPD optically coupled to the optical resonator and disposed at a fixed position with respect to the fourth SCPS of the first photonic device, an optical filter input port optically coupled to the optical resonator, and an optical filter output port optically coupled to the optical resonator.

18. The optomechanical system of claim 17, wherein the optical coupling between the first SCPD and the input port of the first photonic device is weaker than the optical coupling between the optical resonator and the optical filter input port of the optical filter.

19. The optomechanical system of claim 17, wherein a resonance of the optical filter depends on a resonance of the first photonic device.

20. The optomechanical system of claim 19, wherein a difference between a resonance frequency of the optical filter and a resonance frequency of the first photonic device is fixed.

21. An optomechanical system comprising:

a first strong-confinement photonic device (SCPD); and a second SCPD optically coupled to the first SCPD and movably positioned with respect thereto, wherein light coupled into at least the first SCPD adjusts a relative position between the first SCPD and the second SCPD to an optically resonant condition.

* * * * *

UNITED STATES PATENT AND TRADEMARK OFFICE
CERTIFICATE OF CORRECTION

PATENT NO. : 7,583,874 B2  Page 1 of 1
APPLICATION NO. : 12/262999
DATED : September 1, 2009
INVENTOR(S) : Peter Rakich et al.

It is certified that error appears in the above-identified patent and that said Letters Patent is hereby corrected as shown below:

At column 2, line 59, replace "and the location in the first SCPD," with --and the location in the second SCPD,--

In Claim 1, column 18, line 35, replace "the location in the first SCPD and the location in the first" with --the location in the first SCPD and the location in the second--

Signed and Sealed this

Seventeenth Day of November, 2009

David J. Kappos
*Director of the United States Patent and Trademark Office*